US012326672B2

(12) United States Patent
Kobayashi et al.

(10) Patent No.: US 12,326,672 B2
(45) Date of Patent: Jun. 10, 2025

(54) DEVELOPING SLEEVE AND ELECTROPHOTOGRAPHIC IMAGE FORMING APPARATUS

(71) Applicant: Konica Minolta, Inc., Tokyo (JP)

(72) Inventors: Kazutoshi Kobayashi, Hachioji (JP); Yukio Hosoya, Tama (JP); Toshiyuki Fujita, Hachioji (JP); Akihiko Itami, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/610,910

(22) Filed: Mar. 20, 2024

(65) Prior Publication Data

US 2024/0345504 A1 Oct. 17, 2024

(30) Foreign Application Priority Data

Apr. 14, 2023 (JP) ................................ 2023-066090

(51) Int. Cl.
*G03G 15/08* (2006.01)

(52) U.S. Cl.
CPC . *G03G 15/0808* (2013.01); *G03G 2215/0861* (2013.01)

(58) Field of Classification Search
None
See application file for complete search history.

(56) References Cited

U.S. PATENT DOCUMENTS

| | | | | |
|---|---|---|---|---|
| 5,532,721 A * | 7/1996 | Asano | G03G 5/0217 | 346/138 |
| 6,507,722 B2 * | 1/2003 | Okamura | G03G 15/065 | 399/286 |
| 2003/0108363 A1 * | 6/2003 | Do | G03G 15/0818 | 399/279 |
| 2006/0204286 A1 * | 9/2006 | Tsubota | G03G 15/0818 | 399/286 |
| 2013/0149012 A1 * | 6/2013 | Nakao | G03G 15/0921 | 399/277 |
| 2024/0353777 A1 * | 10/2024 | Ishikawa | G03G 15/0818 | |
| 2024/0361710 A1 * | 10/2024 | Nakai | G03G 9/08797 | |

FOREIGN PATENT DOCUMENTS

JP 1995-181809 A 7/1995

OTHER PUBLICATIONS

Smiths, 5052 Aluminum, 2023.*
Smiths, 5083 Aluminum, 2023.*
Smiths, 5251 Aluminum, 2023.*
Smiths, 5754 Aluminum, 2023.*
Alcoa, Alloy 6061, 2002.*
Alcoa, Alloy 6063, 2002.*

* cited by examiner

*Primary Examiner* — Sevan A Aydin
(74) *Attorney, Agent, or Firm* — LUCAS & MERCANTI, LLP

(57) ABSTRACT

A developing sleeve for an electrophotographic image forming apparatus includes an aluminum alloy containing more than 0.6% by mass of silicon and conveys a developer containing a toner and a carrier.

10 Claims, 6 Drawing Sheets

DEVELOPING SLEEVE AND ELECTROPHOTOGRAPHIC IMAGE FORMING APPARATUS

REFERENCE TO RELATED APPLICATIONS

The entire disclosure of Japanese Patent Application No. 2023-066090, filed on Apr. 14, 2023, including description, claims, drawings and abstract is incorporated herein by reference in its entirety.

BACKGROUND OF THE INVENTION

Technical Field

The present invention relates to a developing sleeve and an electrophotographic image forming apparatus. More specifically, the present invention relates to a developing sleeve and an electrophotographic image forming apparatus which are excellent in durability of developer conveying capability and can maintain good image quality.

Description of Related Art

In recent years, for electrophotographic image formation, a member formed of a material using aluminum that is inexpensive and easy to process has been increasingly used as a developer conveyance member.

For example, in Japanese Unexamined Patent Publication No. H07-181809, a sleeve made of aluminum is used as the above-described conveyance member to reduce a problem of image failure at the time of image formation with a two-component developer.

However, since irregularities on the developing sleeve become smaller as the developing sleeve wears during long-term use, there has been room for improvement in order to keep the roughness of the outer peripheral surface of the developing sleeve appropriate and maintain excellent conveying capability.

SUMMARY OF THE INVENTION

The present invention has been made in consideration of the above-mentioned problems and situations. Objects of the present invention include providing a developing sleeve and an electrophotographic image forming apparatus which are excellent in durability of developer conveying capability and can maintain good image quality.

In order to achieve at least one of the objects, the present inventors have conducted studies on the causes and the like of the above-described problems, and as a result, have found that the above-described problems can be solved by providing a developing sleeve for an electrophotographic image forming apparatus, the developing sleeve having an aluminum alloy containing more than 0.6% by mass of silicon and conveying a developer containing a toner and a carrier, and accordingly have reached the present invention.

To achieve at least one of the abovementioned objects, according to an aspect of the present invention, a developing sleeve for an electrophotographic image forming apparatus reflecting one aspect of the present invention includes an aluminum alloy containing more than 0.6% by mass of silicon and conveys a developer containing a toner and a carrier.

According to an aspect of the present invention, an electrophotographic image forming apparatus reflecting one aspect of the present invention includes a developing sleeve including an aluminum alloy containing more than 0.6% by mass of silicon and conveying a developer containing a toner and a carrier.

BRIEF DESCRIPTION OF THE DRAWINGS

The advantages and features provided by one or more embodiments of the present invention will become more fully understood from the detailed description given hereinafter and the appended drawings which are given by way of illustration only, and thus are not intended as a definition of the limits of the present invention, and wherein.

DETAILED DESCRIPTION

Figure 1:
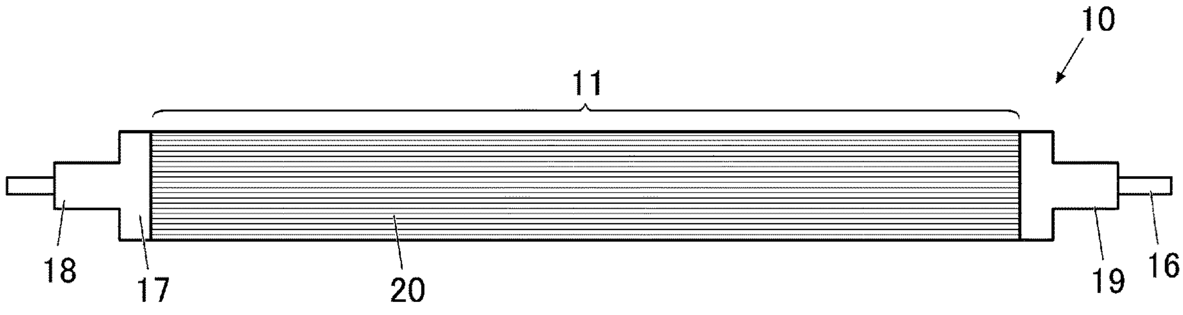
FIG. 1 is an external view of a developing roller including a developing sleeve.

The expression mechanism or action mechanism of the advantageous effects of the present invention are presumed as follows.

The developing sleeve of the present invention is a developing sleeve for an electrophotographic image forming apparatus, the developing sleeve having an aluminum alloy containing more than 0.6% by mass of silicon and conveying a developer containing a toner and a carrier.

Conventionally, in order to impart excellent conveying capability to a developing sleeve, for example, the surface of the developing sleeve made of aluminum is subjected to a blast treatment or the like. Thus, a method of providing roughness initially has been adopted. However, it has been found that with such a method, the surface of the developing sleeve wears during long-term use, the roughness of the outer peripheral surface cannot be kept appropriate, and the conveying capability of aw carrier decreases.

In a system in which a two-component developer containing a carrier and a toner is conveyed by a developing sleeve made of aluminum, conveying capability of the carrier holding the toner is important in order to convey the toner to a developing nip section.

As a means for conveying the carrier while holding the carrier on the surface of the developing sleeve, a means for imparting roughness to the surface of the developing sleeve by sandblasting or the like has been used. This means is used to increase the frictional force between the surface of the developing sleeve and the carrier. As to the roughness initially imparted to the surface of the developing sleeve, during long-term use thereof, uneven shape portions of the roughness are scraped off by rubbing against the carrier, for which ferrite is often used. Then, there has been a problem that a phenomenon occurs in which the frictional force with the carrier decreases and the carrier is less likely to be conveyed.

Examples of the factor of reducing the roughness of the surface of the developing sleeve include rubbing against an external additive such as silicon contained in the toner. When the roughness of the surface of the developing sleeve decreases and the friction force between the surface of the developing sleeve and the carrier decreases, the carrier is not held on the surface of the developing sleeve. This causes a slipping phenomenon. Then, a phenomenon in which the developer is not held on the surface of the developing sleeve and the surface of the developing sleeve is exposed may occur.

If the developer does not exist on the surface of the developing sleeve and the surface of the developing sleeve is exposed, a difference in developing performance occurs between the exposed portions and non-exposed portions. Then, density unevenness occurs. Mainly, in a portion where the developer is not held and the surface of the developing sleeve is exposed, the developing performance decreases, and therefore the density decreases.

In the present invention, the developing sleeve has an aluminum alloy containing more than 0.6% by mass of silicon. This forms a sea-island structure in which microcrystals (eutectics) of silicon are dispersed in an aluminum phase, and forms appropriate irregularities on the outer peripheral surface of the developing sleeve.

Aluminum and silicon are different in hardness. Hence, the content of silicon within a specific range can keep the roughness of the surface of the developing sleeve appropriate even during long-term use of the developing sleeve. Therefore, it is presumed that the durability of the carrier conveying capability of the developing sleeve can be improved, and good image quality can be maintained during image formation.

Hereinafter, one or more embodiments of the present invention will be described with reference to the drawings. However, the scope of the present invention is not limited to the disclosed embodiments.

The developing sleeve of the present invention is a developing sleeve for an electrophotographic image forming apparatus, the developing sleeve having an aluminum alloy containing more than 0.6% by mass of silicon and conveying a developer containing a toner and a carrier. This feature is a technical feature common to or corresponding to the following embodiments (aspects).

As an embodiment of the present invention, it is preferable that the developing sleeve has an aluminum alloy containing more than 0.8% by mass of silicon, from the viewpoint of maintaining durability of developer conveying capability and good image quality.

It is preferable that the developing sleeve does not have a resin layer on the surface of the developing sleeve, from the viewpoint of providing appropriate surface roughness.

It is preferable that the surface of the developing sleeve has grooves from the viewpoint of improving the transportability of the developer.

The surface of the developing sleeve is preferably subjected to sandblasting from the viewpoint of improving the conveying capability of the developer.

It is preferable that the average length RSm of roughness curve elements of the surface of the developing sleeve is greater than or equal to the particle diameter of the carrier from the viewpoint of maintaining the conveying capability of the developer.

The aluminum alloy preferably contains magnesium, and the content of the magnesium is preferably 5.0 mass % or less relative to the total mass of the aluminum alloy, from the viewpoint of improving the strength of the developing sleeve. Furthermore, it is preferable from the viewpoint of stabilizing the grooving to be formed on the surface of the developing sleeve and the run-out accuracy required for the developing roller.

It is preferable that the aluminum alloy contain manganese and the manganese content be 2.0% by mass or less relative to the total mass of the aluminum alloy, from the viewpoint of improving the strength of the developing sleeve. Furthermore, it is preferable from the viewpoint of stabilizing the grooving to be formed on the surface of the developing sleeve and the run-out accuracy required for the developing roller.

The content of silicon is preferably in the range of more than 0.6% by mass and 4.4% by mass or less with respect to the total mass of the aluminum alloy from the viewpoint of maintaining the surface roughness of the developing sleeve during long-term use to improve the developer transportability. Furthermore, it is preferable from the viewpoint of stabilizing the grooving to be formed on the surface of the developing sleeve and the run-out accuracy required for the developing roller.

The electrophotographic image forming apparatus of the present invention is an electrophotographic image forming apparatus provided with a developing sleeve that conveys a developer containing a toner and a carrier, wherein the developing sleeve contains an aluminum alloy containing more than 0.6% by mass of silicon.

Hereinafter, the present invention, constituent elements thereof, and forms and aspects for carrying out the present invention will be described in detail. In the present description, when two figures are used to indicate a range of value before and after "to", these figures are included in the range as a lower limit value and an upper limit value. Note that the advantages and features provided by one or more embodiments of the present invention will be more fully understood from the following detailed description and the accompanying drawings which are given by way of illustration only. Accordingly, it is not intended to define the limits of the present invention.

1. Developing Sleeve

The developing sleeve of the present invention is a developing sleeve for an electrophotographic image forming apparatus, the developing sleeve containing an aluminum alloy containing more than 0.6% by mass of silicon and conveying a developer containing a toner and a carrier.

The developing sleeve preferably contains an aluminum alloy as a main component, and more preferably, 80 mass % or more of the components of the developing sleeve is an aluminum alloy. It is more preferable that 100 mass % of the components of the developing sleeve is the aluminum alloy. The developing sleeve of the present invention preferably has an aluminum alloy containing more than 0.8% by mass of silicon from the viewpoint of maintaining the durability of the developer conveying capability and good image quality.

The "developing sleeve" of the present invention is a means having a function of bearing a moderately charged developer and supplying the developer to an adjacent developing sleeve. Furthermore, the developing sleeve is a means having a function of supplying the developer to a photoreceptor on which an electrostatic charge image has been formed. The developing sleeve may be, for example, a constituent element of a developing roller included in an electrophotographic image forming apparatus. Note that the developing roller is composed of, for example, a developing sleeve, a flange, a shaft, and a magnet roller. The developing roller, which includes the "developing sleeve" according to the present invention as a part of its configuration, may not include a magnet portion, such as a magnet roller, as a part of its configuration.

FIG. 1 is an example of an external view of a developing roller provided with a developing sleeve. The developing sleeve is rotatable and cylindrical, and plays a role of holding the developer on its surface and carrying the same. As shown in FIG. 1, on the surface of the developing sleeve 11, a plurality of grooves 20 extending in the axial direction of the developing roller 10 are formed at predetermined intervals in the circumferential direction. The surface of the developing sleeve of the present invention may not have the above-described grooves.

Figure 2:
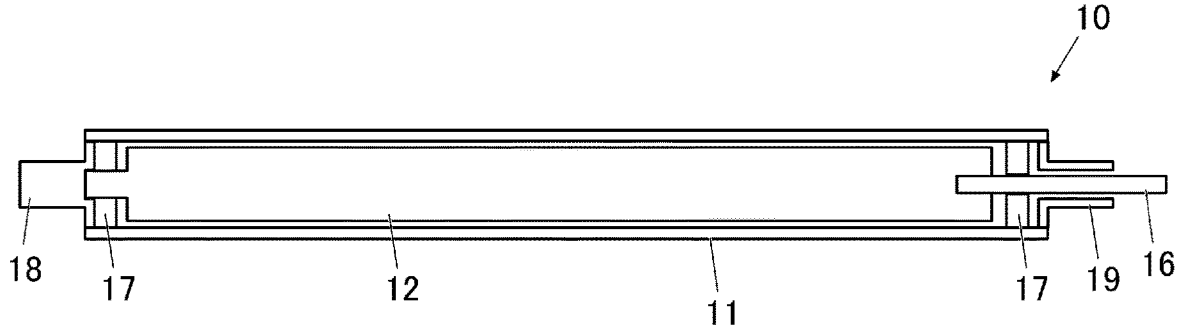
FIG. 2 is a cross-sectional view of a developing roller having a configuration in which a shaft does not penetrate a magnet roller.
Figure 3:
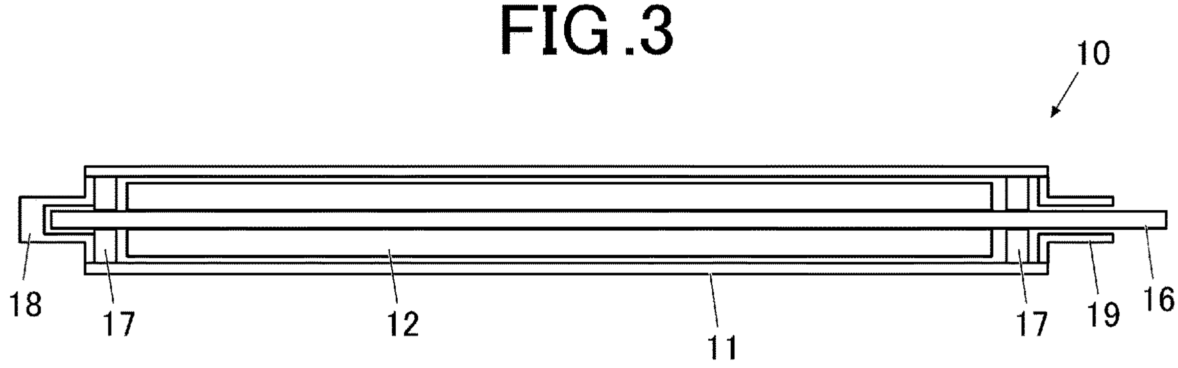
FIG. 3 is a cross-sectional view of a developing roller having a configuration in which a shaft extends through a magnet roller.

FIGS. 2 and 3 are examples of the developing sleeve of the present invention and are axial cross-sectional views of developing rollers which include magnet rollers and shafts having different shapes. However, the developing roller including the developing sleeve of the present invention as a part of the constitution thereof may not include a magnet portion such as a magnet roller as a part of the constitution thereof. Further, the present invention is not limited to the configurations of FIGS. 2 and 3.

FIG. 2 is a cross-sectional view of a developing roller having a configuration in which a shaft does not penetrate a magnet roller. As illustrated in FIG. 2, the developing roller 10 fixes a shaft 16 by inserting the shaft into a hole formed in the magnet roller 12, and includes a developing sleeve 11 of a non-magnetic material on an outer periphery of the magnet roller 12.

FIG. 3 is a cross-sectional view of a developing roller having a configuration in which a shaft extends through a magnet roller. As illustrated in FIG. 3, the developing roller 10 includes a magnet roller 12 fixed around a shaft 16, and a developing sleeve 11 that is made of a non-magnetic material and is provided on an outer periphery of the magnet roller 12.

The developing sleeve 11 is connected to the magnet roller 12 with a predetermined gap therebetween via a bearing part(s) 17 such as a bearing provided outside the magnet roller 12. On the outside of the bearing parts 17 in the axial direction of the developing sleeve 11, a counter-driving side flange 18 and a driving side flange 19 are connected to the developing sleeve 11. The counter-driving side flange 18 and the driving side flange 19 may be reversed, and the present invention is not limited thereto. The counter-driving side flange 18 and the driving side flange 19 are rotationally driven together with the developing sleeve 11 while being held with respect to the developing container.

(1. 1) Aluminum Alloy

The aluminum alloy of the developing sleeve according to the present invention does not include materials forming the above-described flange, shaft, and magnet roller. See FIGS. 1, 2, and 3.

The aluminum alloy includes an aluminum alloy containing silicon, and a content of the silicon is more than 0.6% by mass relative to a total mass of the aluminum alloy. When silicon is contained in the developing sleeve of the present invention, roughness can be imparted to the surface of the developing sleeve. Due to the difference in hardness between aluminum and silicon, the amount of wear of the surface of the developing sleeve during long-term use of the developing sleeve can be made different. In addition, appropriate surface roughness can be imparted to the surface of the developing sleeve and maintained.

When the content of silicon is 0.6% by mass or less, sufficient roughness cannot be imparted to the surface of the developing sleeve due to wear of the developing sleeve during long-term use, resulting in a decrease in conveying force.

When the silicon content is increased, roughness can be imparted to the surface of the developing sleeve, and even when the surface of the developing sleeve wears during long-term use of the developing sleeve, the roughness of the surface is maintained by the effect of the contained silicon, and the strength as the developing sleeve is also increased.

However, when the content of silicon in the aluminum alloy is 12.6% by mass or less, coarse crystals (convex portions) due to the eutectic crystal of silicon and aluminum are less likely to be generated. Therefore, maintaining the surface roughness of the developing sleeve during long-term use can improve the transportability of the carrier easily. In addition, when the content of silicon in the aluminum alloy is excessively increased, while the strength increases, processing such as formation of grooves becomes difficult. Therefore, from the viewpoint of workability, the upper limit of the silicon content in the aluminum alloy is preferably 4.4 mass % or less.

It is preferred that the silicon content be in the range of more than 0.6 mass % and equal to or more than 4.4 mass % to the total mass of the aluminum alloy, in order to make the resistance of the developing sleeve uniform and to prevent the layer formed on the surface of the developing sleeve from peeling off.

The aluminum alloy contains magnesium and/or manganese in addition to silicon in order to ensure strength. When the content of magnesium or manganese is increased and the strength is excessively increased, for example, the grooves formed in the surface of the developing sleeve and the run-out accuracy required for the developing roller are influenced. Therefore, the magnesium content in the aluminum alloy is preferably 5.0% by mass or less because the above-described run-out accuracy is stabilized. From the same viewpoint as described above, the content of manganese in the aluminum alloy is preferably 2.0% by mass or less. Note that the term "run-out accuracy" means a total run-out tolerance in an axial direction or a circumferential direction defined in JIS B0021.

(1. 2) Surface

It is preferable not to have a resin layer on the surface of the developing sleeve of the present invention from the viewpoint of imparting an appropriate surface roughness. As described above, a sea-island structure in which microcrystals (eutectic crystals) of silicon are dispersed in an aluminum phase constituting the developing sleeve is formed. Then, appropriate irregularities are formed on the outer peripheral surface of the developing sleeve, thereby improving the durability of the developer conveying capability.

Figure 4:
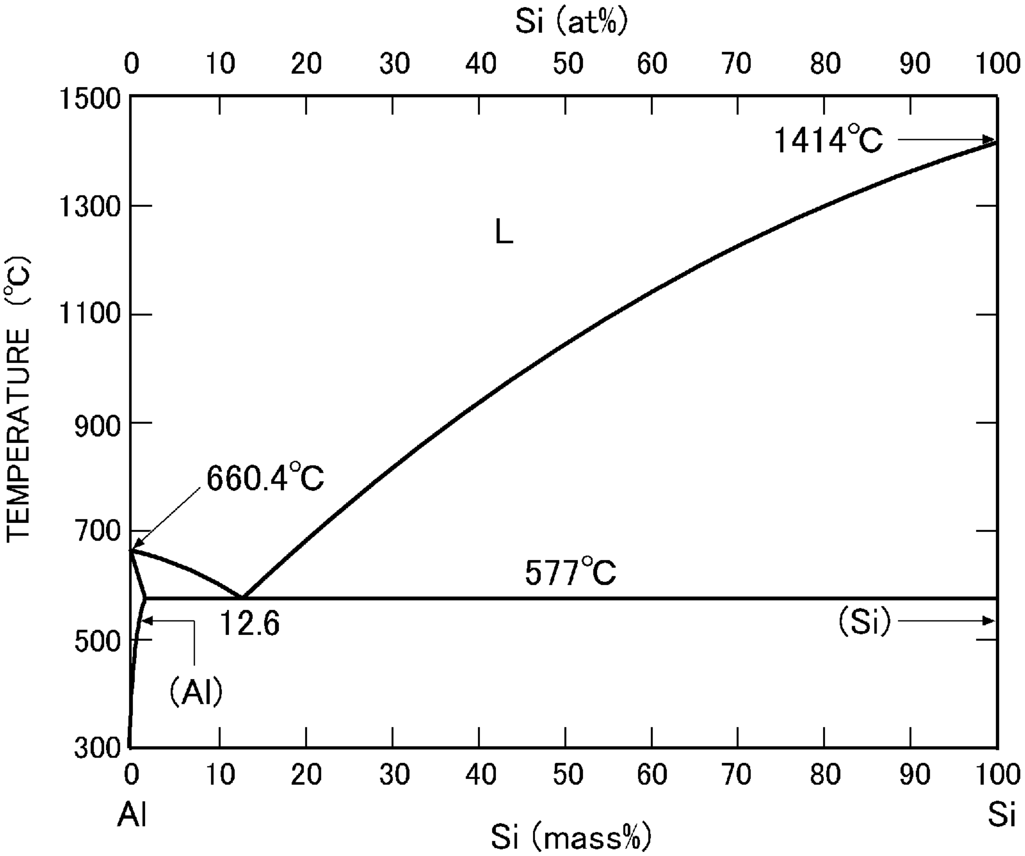
FIG. 4 is a diagram for explaining a state of silicon due to a temperature change.

FIG. 4 is a diagram for explaining a state of silicon due to a temperature change. For example, as shown in FIG. 4, silicon-containing aluminum alloy is a eutectic system having a eutectic point at 577° C. and a silicon-content ratio of 12.6 mass %, and when the alloy in a liquid state (L) is cooled, eutectic solidification occurs. Hereinafter, the "aluminum alloy containing silicon" is also simply referred to as "Si—Al alloy".

Figure 5A:
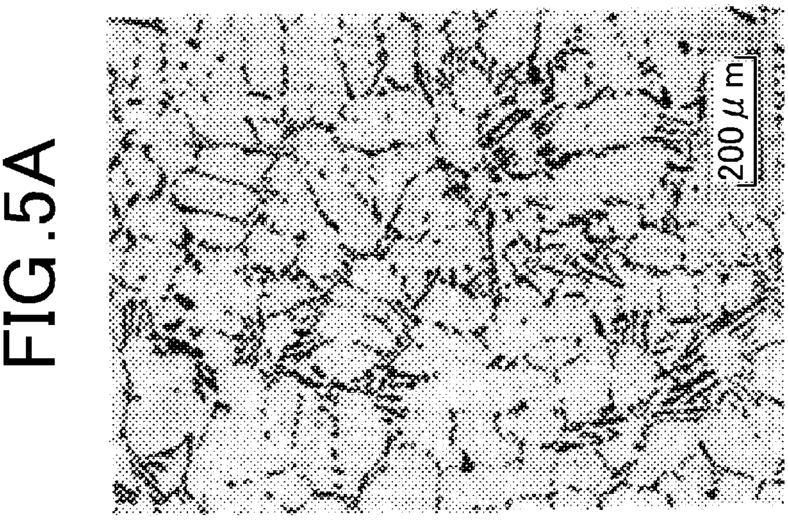
FIG. 5A is a photographic image which shows the eutectic state of Si—Al alloy having a silicon content of 7 mass %.
Figure 5B:
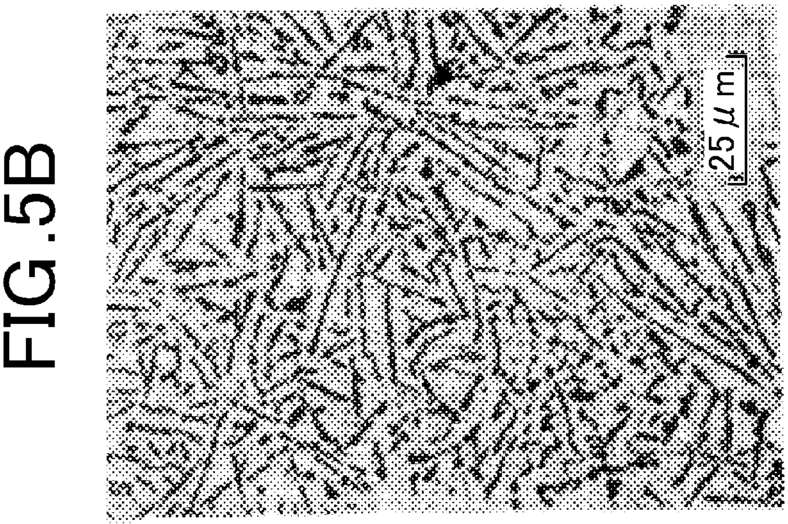
FIG. 5B shows a photographed image illustrating the eutectic state of Si—Al allay having a silicon content of 12.6 mass %.
Figure 5C:
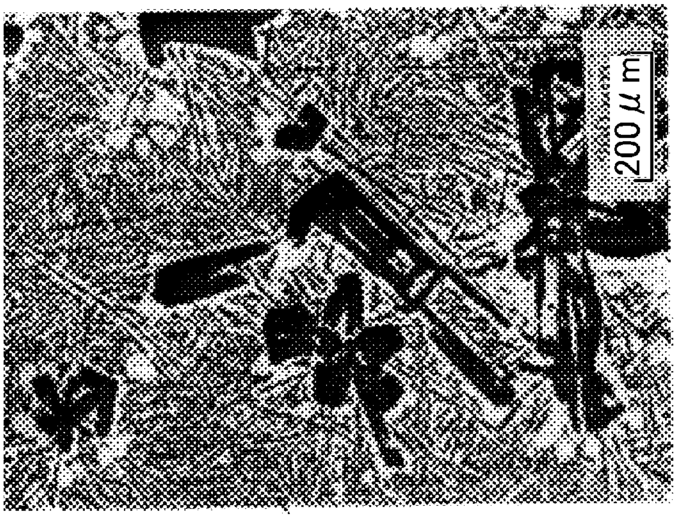
FIG. 5C shows a photographed image representing the eutectic state of Si—Al alloy having a silicon content of 18 mass %.

FIG. 5A to FIG. 5C are part of images taken of the eutectic state of the microstructure of powder samples of silicon-containing aluminum alloy. FIG. 5A is an image capturing a eutectic state at a silicon content rate of 7 mass %, FIG. 5B is an image capturing a eutectic state at a silicon content rate of 12.6 mass %, and FIG. 5C is an image capturing a eutectic state at a silicon content rate of 18 mass %.

The crystal of silicon crystallized as a eutectic crystal hardly dissolves aluminum as a solid solution, and grows as a thin and narrow plate crystal as illustrated in FIG. 5B. On the other hand, when the silicon content is increased to form a hypereutectic state, anisotropic coarse crystals are formed as illustrated in FIG. 5C.

The surface of the Si—Al alloy in the eutectic composition region has a sea-island structure as illustrated in FIG. 5A or 5B. Further, a surface-roughness corresponding to the Si content is given (see Sanji, Kitaoka, et al., Light Metals, Vol. 38, (7), 426, (1988)).

A method for imparting appropriate roughness to the surface of the developing sleeve is not particularly limited. The surface of the developing sleeve is preferably subjected to sandblasting from the viewpoint of improving the conveying capability of the developer. The sandblasting forms irregularities on the surface of the developing sleeve, so that the roughness of the outer peripheral surface can be appropriately maintained and excellent conveying capability can be ensured.

When silicon is contained in the aluminum alloy, a portion containing silicon and a portion not containing silicon are abraded differently on the surface of the developing sleeve even when the sandblasting is performed. Therefore, appropriate surface roughness can be imparted.

The sandblasting is a process of forming an uneven shape by projecting a blast material onto the surface of the developing sleeve and denting the surface in a concave shape with the blast material. Examples of the sandblasting include air blasting, wet sandblasting, and shot blasting.

The material applicable to the sandblasting is not particularly limited, and a known material can be appropriately used. Specific examples thereof include glass beads, alumina particles, silica particles, titania particles, and zirconia particles. Organic fine particles can also be used as a material applicable to sandblasting, and for example, melamine resin particles, benzoguanamine resin particles, crosslinked acrylic resin particles, and the like can be used.

Spherical glass beads or alumina beads are particularly preferable as the material applicable to sandblasting from the viewpoint of imparting an impact force large enough to recess the elastic layer but not to tear the surface of the surface layer. These materials may be used alone or in combination of two or more kinds thereof.

In addition, an appropriate volume average particle diameter of the above-described material varies depending on a target size of irregularities on the surface of the developing sleeve. An appropriate volume average particle diameter is preferably in a range of 3 to 200 μm, more preferably in a range of 10 to 100 μm, and still more preferably in a range of 20 to 80 μm.

It is preferable that the average length RSm of roughness curve elements of the surface of the developing sleeve is greater than or equal to the particle diameter of the carrier from the viewpoint of maintaining the conveying capability of the developer. In the present specification, the "average length RSm of roughness curve elements" is an average distance of intervals between roughness peaks. Also, it accords to JIS standard B0601-2013 (Specifications for Geometrical Characteristics of Products (GPS)—Surface property: Profile method—terms, definitions, and surface property parameters). Hereinafter, the "average length RSm of roughness curve elements" is also simply referred to as "RSm". The "average length RSm of roughness curve elements of the surface of the developing sleeve" is a length of an element(s) corresponding to one cycle of an undulation(s) in a roughness curve.

Figure 6:
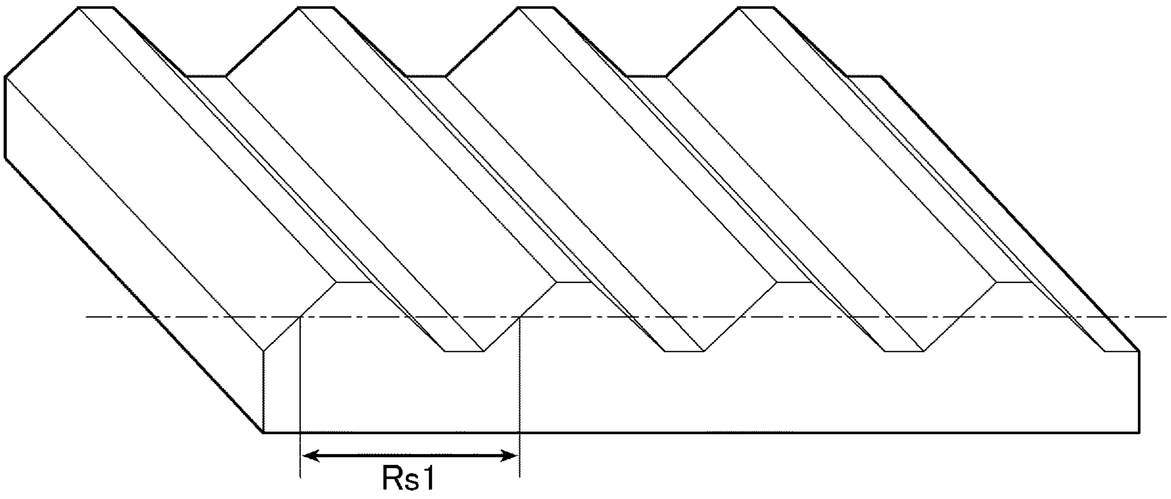
FIG. 6 is a partially enlarged view of a part of the undulations on the surface of the developing sleeve.

FIG. 6 is a partially enlarged view of a part of the undulations on the surface of the developing sleeve. The above-described "RSm" is, for example, the width represented by Rs1 in FIG. 6. The "RSm" is not limited to the groove shape as shown in FIG. 6, and may be, for example, a value obtained by measuring the surface roughness of a surface having no groove. The "Rsm" can be measured by, for example, a surface-roughness tester (model: SE700) manufactured by Kosaka Laboratory Ltd.

In a case where the Rsm described above is greater than or equal to the carrier particle diameter, the developer conveying capability of the surface of the developing sleeve is further enhanced. In addition, a decrease in the conveyance amount is suppressed, and it is possible to suppress the occurrence of density unevenness in a halftone image.

Figure 7:
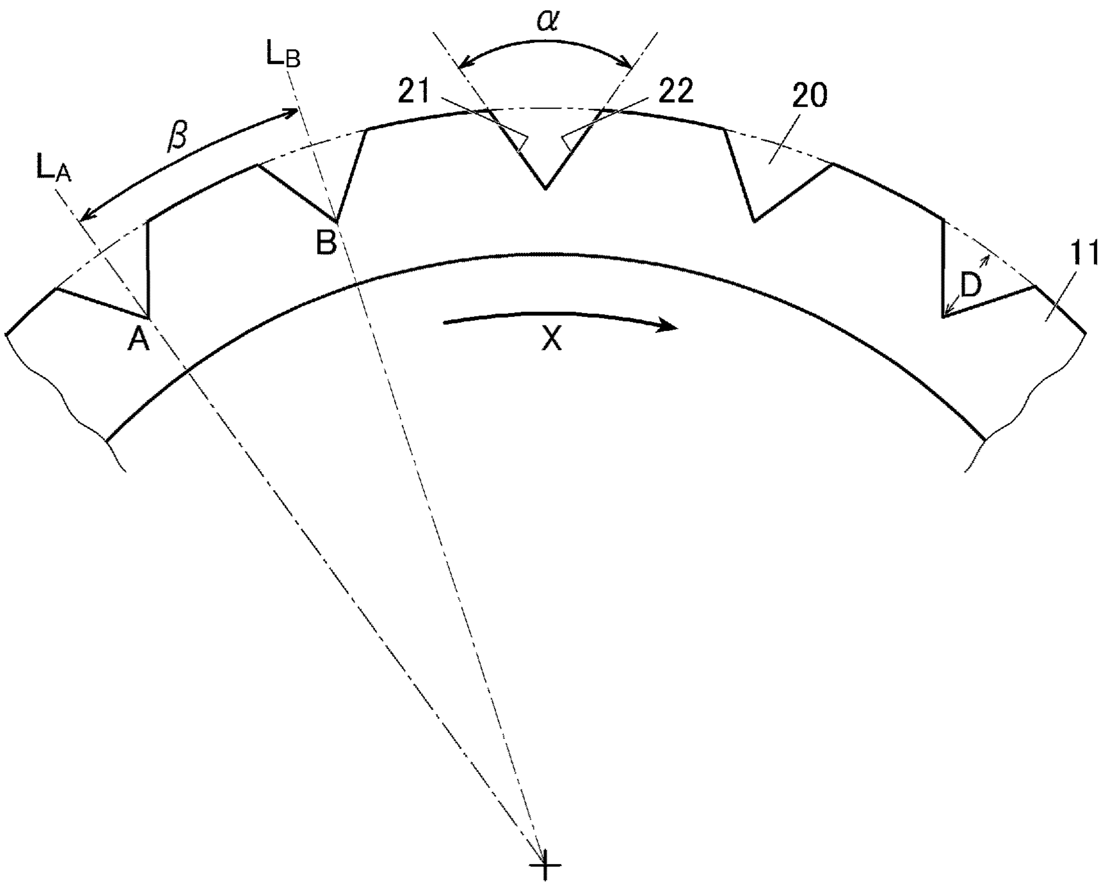
FIG. 7 is a partial enlarged view of a part of a cross section of the developing sleeve.

It is preferable that the surface of the developing sleeve has grooves from the viewpoint of improving the transportability of the developer. FIG. 7 is a partial enlarged view of a part of a cross section of the developing sleeve. Each groove 20 is a V-shaped groove formed by an upstream wall surface 21 located on an upstream side and a downstream wall surface 22 located on a downstream side with respect to a rotation direction X of the developing sleeve 11.

Note that the cross-sectional shape of the developing sleeve of the present invention is not limited to a V-groove shape such as the groove 20 as illustrated in FIG. 7, and may be a flat bottom shape or an arc shape. The developing sleeve 11 in which the grooves 20 are formed on the surface as described above is excellent in abrasion resistance and also excellent in the developer carrying capability by holding the developer on the surface. For example, by forming a plurality of grooves extending in the axial direction of the developing sleeve at predetermined intervals in the circumferential direction, the durability of the developing sleeve during long-term use is improved, and the developer conveying capability is improved.

The depth D of the grooves is preferably within a range of 40 to 120 μm from the viewpoint of excellent transportability. The depth D of the groove can be calculated by photographing with a laser microscope (model: VKX-200) manufactured by Keyence Corporation. The apex angle α of the grooves is preferably 800 or more from the viewpoint of suppressing a decrease in the conveying capability due to clogging with the developer. The vertex angle α is preferably 120° or less from the viewpoint of improving the conveying capability of the developer. The number of grooves in the circumferential direction of the developing sleeve is preferably in a range of 40 to 120. The inter-groove angle β in FIG. 7 is 9° when the number of grooves is 40, and is 3° when the number of grooves is 120.

Note that the inter-groove angle β in FIG. 7 is obtained as follows. A perpendicular line (straight line) is drawn from a direction perpendicular to the surface of the developing sleeve to a specific vertex (vertex A) of the grooves. The straight line is set as $L_A$ and a perpendicular line (straight line) is drawn from a direction perpendicular to the surface of the developing sleeve to a vertex (vertex B) adjacent to the specific vertex A of the grooves. When the straight line is defined as $L_B$, an inter-groove angle formed by the straight line $L_A$ and the straight line $L_B$ is smaller than 90°.

2. Toner for Developing Electrostatic Charge Image (2. 1) Toner Base Particles

The toner base particles according to the present invention may contain a binder resin, a release agent, a colorant, a charge control agent, and external additives such as inorganic fine particles, organic fine particles, and a lubricant. In the present invention, the term "toner particles" refers to toner base particles to which an external additive is added, and an aggregate of toner particles is referred to as a "toner".

In general, the toner base particles can be used as toner particles as they are. In the present invention, toner particles obtained by adding an external additive to toner base particles are used. In the following description, in a case where it is not particularly necessary to distinguish between the toner base particles and the toner particles, they are simply referred to as "toner particles". The constituent materials of the toner base particles according to the present invention are described in detail below.

(2. 2) Binder Resin

As the binder resin contained in the toner base particles included in the toner for developing an electrostatic charge image of the present invention, a conventionally known binder resin can be used. As the conventionally known binder resin, for example, a crystalline resin, an amorphous resin, or the like can be used.

The binder resin refers to a resin that is used as a medium or a matrix (base material) for dispersing and holding internal additives and external additives contained in toner particles and has a function of adhering to a recording medium (for example, sheet) at the time of a fixing process of a toner image. Examples of the internal additive include a release agent, a charge control agent, and a colorant. Examples of the external additive include silica and titanium oxide.

The binder resin preferably contains at least a styrene-acrylic resin. When the binder resin contains a styrene-acrylic resin, excessive bleeding of the release agent at the time of toner fixing is suppressed. In addition, it is possible to improve fixing separability and to suppress contamination in the machine due to the release agent. Note that the binder resin may contain other known resins to the extent that the effects of the present invention are not inhibited.

(Hybrid Crystalline Polyester Resin)

The toner may contain a hybrid crystalline polyester resin as the binder resin. Hereinafter, the "hybrid crystalline polyester resin" is also simply referred to as a "hybrid resin". When the hybrid resin is contained, the affinity with the amorphous resin used in combination is improved, and thus the low-temperature fixability of the toner is improved. In addition, since the dispersibility of the crystalline resin in the toner is improved, bleed-out can be suppressed. One or more hybrid resins may be used. In addition, the hybrid resin may replace the entire amount of the crystalline polyester resin, may replace a part of the crystalline polyester resin, or may be used in combination with the crystalline polyester resin.

The hybrid resin is a resin in which a crystalline polyester polymerization segment and an amorphous polymerization segment are chemically bonded. The crystalline polyester polymerization segment means a portion derived from the crystalline polyester resin. That is, it means a molecular chain having the same chemical structure as the molecular chain constituting the above-described crystalline polyester resin. Further, the amorphous polymerization segment means a portion derived from the amorphous resin. That is, it means a molecular chain having the same chemical structure as the molecular chain constituting the above-described amorphous resin.

A functional group such as a sulfonic acid group, a carboxy group, or a urethane group may be further introduced into the hybrid resin. The functional group may be introduced into the crystalline polyester polymerization segment or the amorphous polymerization segment.

[Weight Average Molecular Weight]

The weight average molecular weight (Mw) of the hybrid resin is preferably within a range of 5000 to 100000. Thus, both sufficient low-temperature fixability and excellent long-term storage stability can be reliably achieved. The weight average molecular weight (Mw) of the hybrid resin is more preferably within a range of 7000 to 50000, and particularly preferably within a range of 8000 to 20000.

When the weight average molecular weight (Mw) of the hybrid resin is 100000 or less, sufficient low-temperature fixability can be obtained. On the other hand, when the weight average molecular weight (Mw) of the hybrid resin is 5000 or more, excessive compatibilization of the hybrid resin and the amorphous resin is suppressed during storage of the toner. In addition, it is possible to effectively suppress image defects due to fusion between the toners.

(Method for Producing Hybrid Resin)

The hybrid resin can be produced by, for example, a first production method, a second production method, and a third production method described below.

[First Manufacturing Method]

The first production method is a production method in which a polymerization reaction for synthesizing a crystalline polyester polymerization segment is performed in the presence of a preliminarily synthesized amorphous polymerization segment. Thus, a hybrid resin can be produced. In this method, first, a monomer constituting the amorphous polymerization segment is subjected to an addition reaction to synthesize the amorphous polymerization segment. The monomer forming the amorphous polymerization segment is preferably a vinyl monomer such as a styrene monomer or a (meth) acrylic acid ester monomer.

Next, a polyvalent carboxylic acid and a polyhydric alcohol are subjected to a polymerization reaction in the presence of the amorphous polymerization segment to synthesize a crystalline polyester polymerization segment. At this time, the polyvalent carboxylic acid and the polyhydric alcohol are subjected to a condensation reaction, and the polyvalent carboxylic acid or the polyhydric alcohol is subjected to an addition reaction with respect to the amorphous polymerization segment, whereby the hybrid resin is synthesized.

In the first production method, it is preferable to incorporate, into the crystalline polyester polymerization segment or the amorphous polymerization segment, a site at which these polymerization segments can react with each other. Specifically, at the time of synthesizing the amorphous polymerization segment, the above-described amphoteric compound is also used in addition to the monomers constituting the amorphous polymerization segment.

When the amphoteric compound reacts with a carboxy group or a hydroxy group in the crystalline polyester polymerization segment, the crystalline polyester polymerization segment is chemically and quantitatively bonded to the amorphous polymerization segment. Furthermore, when the crystalline polyester polymerization segment is synthesized, the above-described compound having an unsaturated bond may be further contained in the monomers.

By the first method, a hybrid resin having a structure (graft structure) in which a crystalline polyester polymerization segment is molecularly bonded to an amorphous polymerization segment can be synthesized.

[Second Production Method]

The second production method is a method of producing a hybrid resin by forming a crystalline polyester polymerization segment and an amorphous polymerization segment, and bonding these segments. In this method, first, a polyvalent carboxylic acid and a polyhydric alcohol are subjected to a condensation reaction to synthesize a crystalline polyester polymerization segment. In addition, separately from the reaction system for synthesizing the crystalline polyester polymerization segment, the amorphous polymerization segment is synthesized by addition polymerization of the monomers constituting the amorphous polymerization segment.

At this time, it is preferable to incorporate, into one or both of the crystalline polyester polymerization segment and the amorphous polymerization segment, a site at which these segments can react with each other as described above.

Next, the synthesized crystalline polyester polymerization segment and amorphous polymerization segment are reacted, so that a hybrid resin having a structure in which these segments are molecularly bonded can be synthesized.

Furthermore, in a case where the reactable site is not incorporated in either of the crystalline polyester polymerization segment and the amorphous polymerization segment, a method may be adopted in which a compound having a site capable of binding to both segments is charged in a system in which both segments coexist. Thus, a hybrid resin having a structure in which the crystalline polyester polymerization segment and the amorphous polymerization segment are molecularly bonded to each other via the compound can be synthesized.

[Third Production Method]

The third production method is a method of producing a hybrid resin by performing a polymerization reaction for synthesizing an amorphous polymerization segment in the presence of a crystalline polyester polymerization segment. In this method, first, a polyvalent carboxylic acid and a polyhydric alcohol are subjected to a condensation reaction for polymerization to synthesize a crystalline polyester polymerization segment.

Next, in the presence of the crystalline polyester polymerization segment, monomers constituting the amorphous polymerization segment are subjected to a polymerization reaction to synthesize the amorphous polymerization segment. At this time, as in the first production method, it is preferable to incorporate, into the crystalline polyester polymerization segment or the amorphous polymerization segment, a site at which these polymerization segments can react with each other.

By the method described above, a hybrid resin having a structure (graft structure) in which an amorphous polymerization segment is molecularly bonded to a crystalline polyester polymerization segment can be synthesized.

Among the first production method, the second production method, and the third production method, the first production method is preferable because a hybrid resin having a structure in which a crystalline polyester resin chain is grafted to an amorphous resin chain is easily synthesized. In addition, it is preferable because the production step can be simplified. In the first production method, since the amorphous polymerization segment is formed in advance and then the crystalline polyester polymerization segment is bonded, the orientation of the crystalline polyester polymerization segment tends to be uniform.

(2. 3) Release Agent (Wax)

The release agent constituting the toner is not particularly limited, and a known release agent can be used. Examples of the release agent include, but are not limited to, polyolefin waxes, branched-chain hydrocarbon waxes, long-chain hydrocarbon-based waxes, dialkyl ketone-based waxes, ester-based waxes, and amide-based waxes. Examples of the polyolefin wax include polyethylene wax and polypropylene wax. Examples of the branched-chain hydrocarbon wax include microcrystalline wax. Examples of the long-chain hydrocarbon-based wax include paraffin wax and Sasol wax. Examples of the dialkyl ketone-based wax include distearyl ketone. Examples of the ester-based wax include carnauba wax, montan wax, behenyl behenate, trimethylolpropane tribehenate, pentaerythritol tetrabehenate, pentaerythritol diacetate dibehenate, glycerin tribehenate, 1,18-octadecanediol distearate, tristearyl trimellitate, and distearyl maleate. Examples of the amide-based wax include ethylenediamine behenylamide and trimellitic acid tristearylamide.

The melting point of the release agent is preferably within a range of 60 to 100° C., and more preferably within a range of 70 to 95° C. By setting the melting point of the release agent within the above range, the heat-resistant storage property of the toner is secured. In addition, even in a case where fixing is performed at a low temperature, stable toner image formation can be performed without causing cold offset or the like. The "melting point" refers to an endothermic peak temperature $W_{(1)}p$ (° C.) derived from the release agent, which is observed in the first heating process in differential scanning calorimetry.

The content of the release agent in the toner is preferably in the range of 1 to 30 mass %, more preferably in the range of 5 to 20 mass %.

(2. 4) Colorant

As the colorant that can constitute the toner, for example, carbon black, a magnetic material, a dye, a pigment, or the like can be appropriately used. Examples of the carbon black include channel black, furnace black, acetylene black, thermal black, and lamp black. Examples of the colorant include a colorant for black, a colorant for magenta, a colorant for red, a colorant for orange, a colorant for yellow, a colorant for green, and a colorant for cyan.

As the magnetic substance, a ferromagnetic metal such as iron, nickel, or cobalt can be used. Further, alloys containing these ferromagnetic metals and compounds of ferromagnetic metals such as ferrite and magnetite can be used. It is also possible to use an alloy which does not contain a ferromagnetic metal but exhibits ferromagnetism by heat treatment. As the alloy that does not contain a ferromagnetic metal but exhibits ferromagnetism by heat treatment, for example, alloys of a type called Heusler alloys, such as manganese-copper-aluminum and manganese-copper-tin, chromium dioxide, and the like can be used.

As the colorant for black, for example, carbon black such as furnace black, channel black, acetylene black, thermal black, and lamp black, and furthermore, magnetic powder such as magnetite and ferrite are used.

Examples of the colorant for magenta or the colorant for red include C. I. Pigment Red 2, 3, 5, 6, 7, 15, 16, 48:1, 53:1, 57:1, 60, 63, 64, 68, 81, 83, 87, 88, 89, 90, 112, 114, 122, 123, 139, 144, 149, 150, 163, 166, 170, 177, 178, 184, 202, 206, 207, 209, 222, 238, and 269.

Examples of the colorant for orange or the colorant for yellow include C. I. Pigment Orange 31 and 43, and C. I. Pigment Yellow 12, 14, 15, 17, 74, 83, 93, 94, 138, 155, 162, 180, and 185.

Examples of the colorant for green or the colorant for cyan include C. I. Pigment Blue 2, 3, 15, 15:2, 15:3, 15:4, 16, 17, 60, 62, and 66, and C. I. Pigment Green 7.

These colorants can be used alone or in combination of two or more kinds thereof, if necessary.

The amount of the colorant to be added is preferably in the range of 1 to 30% by mass and more preferably in the range of 2 to 20% by mass relative to the entire toner. When the amount of the colorant added is within such a range, the color reproducibility of an image can be ensured. As the size of the colorant, the volume average particle diameter is preferably in the range of 10 to 1000 nm. The size of the colorant is preferably in a range of 50 to 500 nm, and particularly preferably in a range of 80 to 300 nm.

(2. 5) Charge Control Agent

As the charge control agent, for example, various known compounds can be used, such as nigrosine-based dyes, metal salts of naphthenic acid or higher fatty acids, alkoxylated amines, quaternary ammonium salt compounds, azo-based metal complexes, and metal salts of salicylic acid.

The amount of the charge control agent to be added is usually preferably within a range of 0.1 to 10 mass %, more preferably within a range of 0.5 to 5 mass %, relative to 100 mass % of the binder resin in the finally obtained toner particles. The size of the charge control agent particles is preferably within a range of 10 to 1000 nm in terms of number average primary particle size. The size of the charge control agent particles is more preferably within a range of 50 to 500 nm, and particularly preferably within a range of 80 to 300 nm.

(2. 6) External Additives

From the viewpoint of improving charging performance, fluidity, or cleanability of the toner, particles such as known inorganic fine particles or organic fine particles, a lubricant, or the like can be added as an external additive to the surface of the toner particles. As these external additive, various kinds thereof can be used in combination.

Preferable examples of the inorganic fine particles to be added as an external additive include silica, titania, alumina, and strontium titanate. Note that these inorganic fine particles may be subjected to hydrophobic treatment, if necessary.

Preferable examples of the organic fine particles to be added as an external additive include spherical organic fine particles having a number average primary particle size in the range of about 10 to 2000 nm. Specifically, it is preferable to add organic fine particles of a homopolymer such as styrene or methyl methacrylate or of a copolymer thereof.

The lubricant is used for the purpose of further improving cleanability and transferability. Preferable examples of the lubricant to be added as an external additive include metal salts of higher fatty acids, such as salts of zinc, aluminum, copper, magnesium, and calcium stearate, salts of zinc, manganese, iron, copper, and magnesium oleate, salts of zinc, copper, magnesium, and calcium palmitate, salts of zinc and calcium linoleate, and salts of zinc and calcium ricinoleate.

The amount of the external additive to be added is preferably in the range of 0.1 to 10.0 mass % relative to 100 mass % of the toner particles.

Examples of a method of adding the external additive include methods of adding the external additive using various known mixing devices such as a Turbula mixer, a Henschel mixer, a Nauta mixer, and a V-type mixer.

(2. 7) Toner Particles (Core-Shell Structure)

The toner base particles can be used as the toner as they are. The toner particles may have a multilayer structure such as a core-shell structure including the toner base particles as core particles and a shell layer covering the core particles and the surface thereof.

The shell layer may not cover the entire surface of the core particles. The core particles may be partially exposed. The cross section of the core-shell structure can be observed by a known observation means such as a transmission electron microscope (TEM) or a scanning probe microscope (SPM).

In the case of the core-shell structure, properties such as a glass transition point, a melting point, and hardness can be made different between the core particles and the shell layer, and thus the toner particles can be designed according to the purpose. For example, the shell layer can be formed by aggregating and fusing a resin having a relatively high glass transition point (Tg) on the surface of core particles containing a binder resin, a colorant, a release agent, and the like and having a relatively low glass transition point (Tg). The shell layer preferably contains an amorphous resin.

(Particle Diameter)

Regarding the particle diameter of the toner particles, the volume-based median diameter ($d_{50}$) is preferably in a range of 3 to 10 μm and more preferably in a range of 5 to 8 μm. Within this range, high reproducibility can be obtained even in the case of a very minute dot image at the 1200 dpi level. The particle diameter of the toner particles can be controlled by the concentration of the aggregating agent used at the time of production, the addition amount of the organic solvent, the fusion time, the composition of the binder resin, and the like.

For the measurement of the median diameter ($d_{50}$), a measuring apparatus in which a computer system equipped with data processing software "Software V3.51" is connected to Multisizer 3 manufactured by Beckman Coulter, Inc. can be used.

Specifically, after a measurement sample (toner) is added to a surfactant solution to be wetted, ultrasonic dispersion is performed to prepare a toner particle dispersion liquid. The surfactant solution is a surfactant solution to be added for the purpose of dispersing the toner particles, and is, for example, a surfactant solution obtained by diluting a neutral detergent containing a surfactant component with pure water by 10 times.

This toner particle dispersion liquid is injected into a beaker containing ISOTONII (manufactured by Beckman Coulter, Inc.) in a sample stand with a pipette until the display concentration of the measuring apparatus becomes 8%. By the display concentration of the measuring apparatus to 8%, reproducible measured values can be obtained. In the measuring apparatus, the measurement particle count number is set to 25000, the aperture diameter is set to 100 μm, and the frequency value is calculated by dividing the range of 2 to 60 μm, which is the measurement range, into 256. The particle diameter at 50% from the largest volume-integrated fraction is obtained as the volume-based median diameter ($d_{50}$).

(Average Circularity)

From the viewpoint of enhancing the stability of chargeability and the low-temperature fixability, the average circularity of the toner particles is preferably in the range of 0.930 to 1.000, and more preferably in the range of 0.950 to 0.995. When the average circularity of the toner particles is within the above range, the individual toner particles are unlikely to be crushed, contamination of a triboelectric charge-imparting member can be suppressed to stabilize the chargeability of the toner, and the quality of the image to be formed can be enhanced.

The average circularity of the toner particles can be measured using FPIA 2100 (manufactured by Sysmex Corporation). Specifically, the measurement sample (toner) is wetted with an aqueous surfactant-containing solution and subjected to ultrasonic dispersion for 1 minute for dispersion.

Thereafter, imaging is performed with FPIA-2100 (manufactured by Sysmex Corporation) under measurement conditions of an HPF (high-power field imaging) mode at an appropriate density of an HPF detection number of 3000 to 10000. When the HPF detection number is within the above range, a reproducible measurement value can be obtained. From the photographed particle image, the circularity of each toner particle is calculated according to the following formula (I), and the average circularity is obtained by adding the circularity of each toner particle and dividing the result by the total number of toner particles.

Circularity=(perimeter of a circle having the same projected area as a particle image)/(perimeter of a particle projection image) Formula (I)

3. Method for Producing Toner for Developing Electrostatic Charge Image

As a method for producing the toner for developing an electrostatic charge image(s) according to the present invention, for example, an emulsion polymerization aggregation method or an emulsion aggregation method can be suitably adopted.

The emulsion polymerization aggregation method is a method performed as follows. A dispersion liquid of fine particles of a binder resin produced by an emulsion polymerization method is mixed with a dispersion liquid of fine particles of a colorant and a dispersion liquid of a release agent such as wax. The aggregation is performed until the toner particles have a desired particle diameter. In addition, shape control is performed by performing fusion between the binder resin fine particles, so that toner particles are produced. Hereinafter, the "fine particles of a binder resin" are also referred to as "binder resin fine particles". Further, the "fine particles of a colorant" are also referred to as "colorant fine particles".

The emulsion aggregation method is a method performed as follows. A binder resin solution dissolved in a solvent is added dropwise to a poor solvent to obtain a resin fine particle dispersion liquid. This resin fine particle dispersion liquid is mixed with a colorant dispersion liquid and a release agent dispersion liquid such as wax. Next, the mixture is aggregated until a desired toner particle diameter is obtained. In addition, shape control is performed by performing fusion between the binder resin fine particles, so that toner particles are produced.

The toner of the present invention can be produced by either the emulsion polymerization aggregation method or the emulsion aggregation method. As a method for producing the toner of the present invention, steps thereof in the case of using the emulsion polymerization aggregation method are shown below as (1) to (7), as an example.

(1) Step of preparing a dispersion liquid in which fine particles of a colorant are dispersed in an aqueous medium
(2) Step of preparing a dispersion liquid in which binder resin fine particles containing an internal additive(s) as necessary are dispersed in an aqueous medium
(3) Step of preparing a dispersion liquid of binder resin fine particles by emulsion polymerization
(4) Step of mixing the dispersion liquid of colorant fine particles and the dispersion liquid of binder resin fine particles to aggregate, associate and fuse the colorant fine particles and the binder resin fine particles, thereby forming toner base particles
(5) Step of filtering the toner base particles from the dispersion (aqueous medium) of the toner base particles to remove a surfactant and the like
(6) Step of drying the toner base particles
(7) Step of adding an external additive(s) to the toner base particles When the toner is produced by the emulsion polymerization aggregation method, the binder resin fine particles obtained by the emulsion polymerization method may have a multilayer structure of two or more layers composed of binder resins having different compositions. The binder resin fine particles having such a composition, for example, those having a two-layer structure, are obtained as follows. A dispersion liquid of resin particles is prepared by an emulsion polymerization treatment (first stage polymerization) according to an ordinary method. To this dispersion liquid, a polymerization initiator and a polymerizable monomer are added. This system is subjected to polymerization (second stage polymerization). By the emulsion polymerization aggregation method, toner particles having a core-shell structure can also be obtained.

Specifically, in the preparation of the toner particles having a core-shell structure, first, binder resin fine particles for core particles and fine particles of a colorant are aggregated, associated, and fused to form core particles. Next, binder resin fine particles for a shell layer are added to the dispersion liquid of the core particles, so that the binder resin fine particles for a shell layer are aggregated and fused onto the surfaces of the core particles. Thus, a shell layer covering the surface of the core particle can be formed.

As the method for producing the toner of the present invention, steps thereof in the case of using a pulverization method are shown below (1) to (5), as an example.

(1) Step of mixing a binder resin, a colorant, and, if necessary, an internal additive(s) with a Henschel mixer or the like
(2) Step of kneading and hearting the obtained mixture with an extrusion kneader or the like
(3) Step of subjecting the obtained kneaded product to a coarse pulverization treatment with a hammer mill or the like, and then to a pulverization treatment with a turbo mill pulverizer or the like
(4) Step of subjecting the resulting pulverized product to a fine powder classification treatment using, for example, an airflow classifier utilizing the Coanda effect to form toner base particles
(5) Step of adding an external additive to the toner base particles Note that embodiments to which the present invention can be applied are not limited to the above-described embodiment(s), and can be appropriately modified without departing from the scope of the present invention.

4. Developer

The toner for developing an electrostatic charge image of the present invention is mixed with a carrier and used as a two-component developer, but various components can be added depending on the purpose, and the toner is not limited to being made of two components.

When the toner is used as a two-component developer, magnetic particles formed of a conventionally known material can be used as the carrier. Examples of the magnetic particles include those of metals such as iron, ferrite, and magnetite, and alloys of these metals and metals such as aluminum and lead. In particular, ferrite particles are preferable as the carrier.

As the carrier, a coated carrier in which the surface of magnetic particles are coated with a coating agent such as a resin or a dispersion type carrier in which magnetic fine powder is dispersed in a binder resin may be used. The volume-based median diameter ($d_{50}$) of the carrier is preferably in the range of 20 to 100 μm, and more preferably in the range of 25 to 80 μm. The volume-based median diameter ($d_{50}$) of the carrier can be measured by, for example, a laser diffraction particle size distribution analyzer HELOS (manufactured by SYMPATEC GmbH) equipped with a wet disperser.

5. Electrophotographic Image Forming Apparatus

The electrophotographic image forming apparatus of the present invention is an electrophotographic image forming apparatus provided with a developing sleeve that conveys a developer containing a toner and a carrier, wherein the developing sleeve contains an aluminum alloy containing more than 0.6% by mass of silicon. The image forming apparatus also includes, for example, a charging unit, an exposure unit, a developing unit, and a transfer unit.

Figure 8:
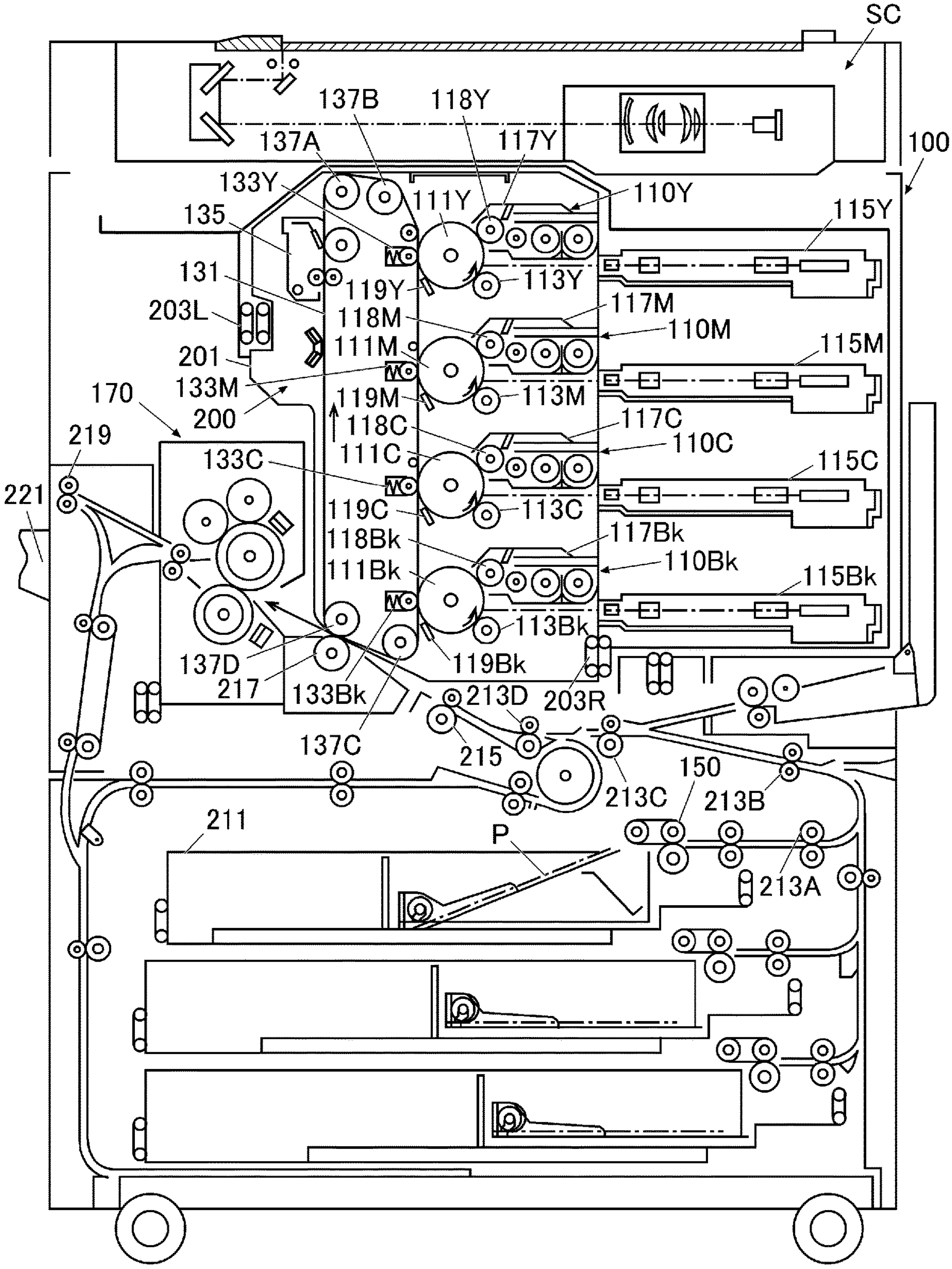
FIG. 8 is an explanatory cross-sectional view illustrating an example of the configuration of an electrophotographic image forming apparatus of the present invention.

FIG. 8 is an explanatory cross-sectional view illustrating an example of the configuration of an electrophotographic image forming apparatus of the present invention. The image forming apparatus 100 shown in FIG. 8 is called a tandem-type color image forming apparatus. The image forming apparatus 100 further includes four image forming units 110Y, 110M, 110C, and 110Bk, a sheet feed conveyance section 150, and a fixing section 170.

At the upper part of the main body of the image forming apparatus 100, a document image reading device SC is arranged.

The image forming units 110Y, 110M, 110C, and 110Bk are arranged side by side in the vertical direction. The image forming units 110Y, 110M, 110C, and 110Bk include rotating drum-shaped photoreceptors 111Y, 111M, 111C, and 111Bk, respectively. The image forming units include charging units 113Y, 113M, 113C, and 113Bk sequentially arranged along a rotation direction of the photoreceptors in outer peripheral surface regions of the photoreceptors. They also have exposing units 115Y, 115M, 115C and 115Bk. They also have developing units 117Y, 117M, 117C and 117Bk. The image forming units include primary transfer rollers (primary transfer units) 133Y, 133M, 133C, and 133Bk. They also include cleaning units 119Y, 119M, 119C, and 119Bk.

Yellow (Y), magenta (M), cyan (C), and black (Bk) toner images are formed on the photoreceptors 111Y, 111M, 111C, and 111Bk, respectively.

Hereinafter, the image forming unit 110Y will be described as an example with reference to the drawings.

<Charging Unit>

The charging unit is a unit that uniformly charges the surface of the photoreceptor. Examples of the charging unit include a contact type such as a charging roller, a charging brush and a charging blade, and a non-contact type such as a corona charging device (corotron charging device, scorotron charging device and the like).

The contact method is advantageous in that the amount of harmful ozone gas generated in the charging process is small. The non-contact method is advantageous in that it is not proximity discharge as compared with the contact method, and filming is less likely to occur. The charging unit included in the image forming system of the present invention may be of a contact type or a non-contact type.

The charging unit is preferably a proximity charging roller or a contact charging roller from the viewpoint that the amount of harmful ozone gas generated in the charging process is small and that it is advantageous for achieving higher image quality and downsizing of the apparatus.

The charging unit 113Y illustrated in FIG. 8 is a contact type. The charging unit 113Y is composed of a charging roller disposed in contact with the photoreceptor 111Y and a power source for applying a voltage to the charging roller.

<Exposure Unit>

The exposure unit is a unit for performing exposure based on an image signal on the photoreceptor to which the uniform potential has been applied by the charging unit, to form an electrostatic latent image corresponding to the image. Examples of the exposure unit include an exposure unit including an LED in which light emitting elements are arranged in an array in the axial direction of the photoreceptor and an image forming element, and an exposure unit of a laser optical system.

<Developing Unit>

The developing unit (developing device) is a unit for supplying a developer to the surface of the photoreceptor and developing the electrostatic latent image formed on the surface of the photoreceptor to form a toner image. Note that as the developer, a developer containing the above-described toner and carrier is used.

The developing unit may be provided with a lubricant supplying unit for supplying a lubricant to the developer, and the developer supplied by the developing unit preferably contains a lubricant from the viewpoint of improving abrasion resistance. The lubricant is more preferably a metal soap from the viewpoint of improving abrasion resistance.

The developing unit 117Y illustrated in FIG. 8 is, to be specific, composed of a developing roller 118Y which has a built-in magnet and rotates while holding a developer, and a voltage application device (not illustrated) which applies DC and/or AC bias voltage between the photoreceptor 111Y and the photoreceptor 118Y.

Note that the above-described developing roller is formed of the developing sleeve, the flange, the shaft, and the magnet roller as described above. The aluminum alloy of the developing roller has a silicon content of more than 0.6% by mass.

The developer is conveyed to the photoreceptor 111Y by the rotation of the developing roller 118Y. Next, the thin toner layer on the developing roller 118Y comes into contact with the photoreceptor 111Y and develops the electrostatic latent images on the photoreceptor 111Y.

The developing roller 118Y is connected to the voltage application device. By this voltage application device, a DC and/or AC bias voltage(s) is/are applied to the developing roller 118Y. By controlling the voltage applied to the developing roller 118Y, the developing bias can be adjusted to a desired value.

Due to a potential difference (developing potential difference) between the potentials of the electrostatic latent image held by the developing roller 118Y and the photoreceptor 111Y, an electric field is formed in a developing section where the developing roller 118Y and the photoreceptor 111Y face each other. The toner in the developer conveyed to the developing section by the rotation of the developing roller 118Y moves by the action of the power received from the electric field, and is attracted to the electrostatic latent image on the photoreceptor 111Y.

When the electrostatic latent image held by the photoreceptor 111Y is visualized, a toner image corresponding to the shape of the electrostatic latent image is formed on the surface of the photoreceptor 111Y.

<Transfer Unit>

The transfer unit is a unit for transferring the toner image on the photoreceptor to a transfer body (intermediate transfer body or transfer material). When an intermediate transfer body is used, the primary transfer roller serves as a transfer unit. The "transfer unit" in the present invention is a unit for transferring the "toner image on the photoreceptor", and therefore, the secondary transfer roller used in the transfer from the intermediate transfer body to the transfer material is not included in the "transfer unit".

The primary transfer roller 133Y shown in FIG. 8 transfers the toner image formed on the photoreceptor 111Y to an intermediate transfer body 131 in the shape of an endless belt. The primary transfer roller 133Y is disposed in contact with the intermediate transfer body 131.

The image forming apparatus 100 illustrated in FIG. 8 transfers toner images formed on the photoreceptors 111Y, 111M, 111C, and 111Bk to the intermediate transfer body 131 by the primary transfer rollers (primary transfer units) 133Y, 133M, 133C, and 133Bk. Then, an intermediate transfer method is adopted in which the toner images transferred onto the intermediate transfer body 131 are transferred onto a transfer material P by a secondary transfer roller (secondary transfer unit) 217. Note that the image forming apparatus is not limited to the intermediate transfer method, and a direct transfer method in which toner images formed on photoreceptors are directly transferred to a transfer material P by a transfer unit may be adopted.

EXAMPLES

Hereinafter, the present invention will be specifically described with reference to Examples, but the present invention is not limited thereto. In Examples, "part(s)" or "%" means "part(s) by mass" or "% by mass" unless otherwise specified.

A. Production of Developing Sleeve 1

(A. 1) Production of Hollow Cylindrical Tube of Aluminum Alloy

A hollow cylindrical tube was produced using, as the aluminum alloy, an aluminum alloy in which a content of silicon (Si) was 0.65 mass %, a content of magnesium (Mg) was 0.03 mass %, and a content of manganese (Mn) was 0.01 mass % with respect to the total mass of the aluminum alloy.

(A. 2) Formation of Grooves

On the surface of the hollow cylindrical tube, V-shaped grooves were formed at equal intervals in the circumferential direction, and the outer peripheral surface of the cylinder was subjected to sandblasting by spraying glass beads with a blast gun, whereby a developing sleeve 1 was produced. As the V-shaped grooves, for example, as illustrated in FIG. 7, the depth D of the grooves was 75±25 μm, the vertex angle α of the V-shaped grooves was 100°, the number of grooves in the circumferential direction of the developing sleeve was 40, and the inter-groove angle β was 9°. Note that the developing sleeve 1 was produced to have an outer diameter of 16 mm and a thickness of 1 mm. Note that the processing conditions of the sandblasting were as follows.

<Processing Conditions>

Type of glass beads: FGB #80 (manufactured by Fuji Manufacturing Co., Ltd)

Feed rate of glass beads: 200 g/min

Ejection distance from blast gun to cylinder: 100 mm

Movement speed of blast gun: 5.0 cm/sec

Compressed air pressure: 0.23 MPa

Rotation speed of cylinder: 545 rpm

In addition, the surface of the developing sleeve 1 was photographed with a laser microscope (model: VKX-200) manufactured by Keyence Corporation, and the depth D of the grooves in the circumferential direction of the support was measured. Specifically, 3 points in the axial direction and 4 points in the circumferential direction of the support, 12 points in total, were photographed at a magnification of 500. The captured image was binarized using image analysis software, and the depths D of all the linear grooves in the image were calculated. When the range of the depth D of 90% or more of all the linear grooves was calculated from the calculated depths of the linear grooves, it was 100 μm.

B. Production of Developing Sleeves 2 to 19

(B. 1) Preparation of Aluminum Alloy and Production of Hollow Cylindrical Tube

Hollow cylindrical tubes were produced using the aluminum alloys listed in Table I.

(B. 2) Formation of Grooves

Grooves were formed at equal intervals in the circumferential direction in each hollow cylindrical tube, to form a surface shape of V-shaped grooves. As the V-shaped grooves, for example, as shown in FIG. 7, the depth D of the grooves is 75±25 μm, and the apex angle α of the V-shaped grooves is 100°. Furthermore, the number of grooves in the circumferential direction of each developing sleeve was 40, and the inter-groove angle β was 9°. Thus, the groves same as those of the developing sleeve 1 were formed. However, V-shaped grooves were not formed on the developing sleeves 5 and 6.

Furthermore, as described in Table 1, the developing sleeves 2 to 17 and 19 were subjected to sandblasting. Note that the developing sleeve 18 was not subjected to sandblasting. The developing sleeves 2 to 19 were each produced to have an outer diameter of 16 mm and a thickness of 1 mm.

C. Production of Developing Rollers 1 to 19

A magnet roller, a shaft, and a flange were attached to each of the developing sleeves 1 to 19 to produce developing rollers 1 to 19.

D. Preparation of Toner (D. 1) Preparation of Resin Fine Particle Dispersion Liquid (D. 1. 1) Production of Crystalline Resin

[Production of Crystalline Resin (1a)]

A starting monomer (1a-1) for an addition polymerization resin (styrene-acrylic resin) segment containing a dually reactive monomer shown below and 4 parts by mass of di-t-butyl peroxide as a radical polymerization initiator were placed in a dropping funnel.

| <Starting Monomer (1a-1)> | |
|---|---|
| Styrene | 20.0 parts by mass |
| n-butyl acrylate | 8 parts by mass |
| Acrylic acid | 1.75 parts by mass |

Furthermore, a row material monomer (1a-2) for a polycondensation resin (crystalline polyester resin) segment was placed in a four-neck flask equipped with a nitrogen-introducing tube, a dewatering tube, a stirrer, and a thermocouple, and was heated to 170° C. to be dissolved.

| <Starting Monomer (1a-2)> | |
|---|---|
| Sebacic acid (acid) | 412.6 parts by mass |
| 1,6-Hexanediol (alcohol) | 152.6 parts by mass |

Next, the monomers (1a-1) and (1a-2) were put into a reaction vessel equipped with a stirrer, a thermometer, a cooling tube, and a nitrogen gas-introducing tube, and the inside of the reaction vessel was replaced with dry nitrogen gas to obtain a mixture.

To the obtained mixture, 0.4 parts by mass of $Ti(O\text{-}n\text{-}Bu)_4$ was added, the temperature was raised to 235° C., and the mixture was reacted under ordinary pressure (101.3 kPa) for 5 hours, and further reacted under reduced pressure (8 kPa) for 1 hour, so that a reaction liquid was obtained.

The obtained reaction liquid was cooled to 200° C., and then, reaction was performed under reduced pressure (20 kPa) such that the acid number calculated by the above-described measurement method was 20.0 mgKOH/g. Thus, a crystalline resin (1a) was produced.

(D. 1. 2) Preparation of Dispersion Liquid

[Preparation of Crystalline Resin Fine Particle Dispersion Liquid (1A)]

In a reaction vessel, 174.3 parts by mass of the crystalline resin (1a) and 102 parts by mass of methylethyl ketone were put and stirred at 75° C. for 30 minutes to be dissolved, and 3.1 parts by mass of 25 mass % aqueous sodium hydroxide was added to obtain a solution.

The above solution was placed in a reaction vessel having a stirrer, and while it was stirred, 375 parts by mass of water warmed to 70° C. was added thereto dropwise over 70 minutes to be mixed. The liquid in the reaction vessel became cloudy during the dropwise addition, and became a uniformly emulsified state after the dropwise addition of the entire amount, so that an emulsified liquid (1a) was obtained.

While the emulsified liquid (1a) was kept at 70° C., a diaphragm vacuum pump "V-700" (manufactured by Buchi Labortechnik GmbH) was used. The pressure was reduced to 15 kPa (150 mbar), and the emulsified liquid (1a) was stirred for 3 hours to distill off methylethyl ketone. Thereafter, it was cooled at a cooling rate of 6° C./min to prepare a crystalline resin fine particle dispersion liquid (1A) in which fine particles of the crystalline resin (1a) were dispersed.

The volume average particle diameter of the crystalline resin (1a) in the crystalline resin fine particle dispersion liquid (1A) was measured with a laser diffraction type particle size distribution analyzer "LA-750" (manufactured by HORIBA, Ltd), which is a particle size distribution analyzer. As a result, the volume average particle diameter of the crystalline resin (1a) was 202 nm.

(D. 1. 3) Composition Ratio and Melting Point of Styrene-acrylic Modified Crystalline Polyester The melting point of the crystalline resin (1a) in the crystalline resin fine particle dispersion liquid (1A) was 62° C.

The composition ratio of the styrene-acrylic modified crystalline polyester was 95 parts by mass of the crystalline polyester segment and 5 parts by mass of the styrene-acrylic copolymer segment. Note that the composition ratio of the styrene-acrylic modified crystalline polyester is a value calculated from the total mass of the starting monomer (1a-1) and the total mass of the starting monomer (1a-2) in preparation of the crystalline resin (1a). The total mass of the starting monomer (1a-1) is 29.75 parts by mass, and the total mass of the starting monomer (1a-2) is 565.2 parts by mass.

As described above, in the present invention, the "melting point" is an endothermic peak temperature $C_{(1)}p$ (° C.) of the crystalline resin observed in the first heating process in differential scanning calorimetry, and the "melting point" is the above-described $C_{(1)}p$ (° C.).

(D. 2) Preparation of Amorphous Resin Fine Particle Dispersion Liquid

[Preparation of Amorphous Resin Fine Particle Dispersion Liquid (1)]

(First Stage Polymerization)

Into a 5 L reaction vessel fitted with a stirrer, a temperature sensor, a cooling tube and a nitrogen-introducing device, 8 parts by mass of sodium dodecylsulfate and 3000 parts by mass of ion-exchanged water were put and the internal temperature was raised to 80° C. while they were stirred at a stirring speed of 230 rpm under a nitrogen airflow. After the temperature was raised, a solution of 10 parts by mass of potassium persulfate dissolved in 200 parts by mass of ion-exchanged water was added, the liquid temperature was again set at 80° C., and the mixture of the following starting monomer (1b-1) was added dropwise over 1 hour.

| <Starting Monomer (1b-1)> | |
|---|---|
| Styrene | 480.0 parts by mass |
| n-Butyl acrylate | 250.0 parts by mass |
| Methacrylic acid | 68.0 parts by mass |

After dropwise addition of the mixed solution of the starting monomer (1b-1), the starting monomer (1b-1) was polymerized by heating and stirring at 80° C. for 2 hours, to prepare a vinyl-based resin fine particle dispersion liquid (S1) of a first stage polymerization liquid.

(Second Stage Polymerization)

Into a 5 L reaction vessel equipped with a stirrer, a thermometer, a cooling tube, and a nitrogen gas introducing device, 1100 parts by mass of ion-exchanged water and 289 parts by mass of the vinyl-based resin fine particle dispersion liquid (S1) (first stage polymerization liquid) prepared by the first stage polymerization were put. Thereafter, the mixture was heated to 87° C. Thereafter, a mixed liquid in which the following starting monomer (1b-2), a chain transfer agent, and a release agent were dissolved at 85° C. was subjected to a mixing and dispersing treatment for 10 minutes using a mechanical dispersing machine CLEARMIX (manufactured by M Technique Co., Ltd) having a circulating path. Thus, a dispersion liquid containing emulsified particles (oil droplets) was prepared.

| <Starting Monomer (1b-2)> | |
|---|---|
| Styrene | 253.0 parts by mass |
| 2-ethylhexyl acrylate | 107.3 parts by mass |
| Methacrylic acid | 39.2 parts by mass |

| <Chain Transfer Agent> | |
|---|---|
| n-octy1-3-mercaptopropionate | 4.45 parts by mass |

| <Release Agent> | |
|---|---|
| Behenic acid behenate | 120.0 parts by mass |

The dispersion liquid containing the emulsified particles (oil droplets) was added to the 5 L reaction vessel, and a polymerization initiator in which 5.5 parts by mass of potassium persulfate was dissolved in 103 parts by mass of ion-exchanged water was added. The system was heated and stirred at 87° C. for 1 hour to perform polymerization. Thus, a vinyl-based resin fine particle dispersion liquid (S1') was prepared.

(Third Stage Polymerization)

To the vinyl-based resin fine particle dispersion liquid (S1') obtained by the second stage polymerization, a solution of 7.4 parts by mass of potassium persulfate dissolved in 157.9 parts by mass of ion-exchanged water was added. Further, under a temperature condition of 84° C., a mixed liquid of the following starting monomer (1b-3) and a chain transfer agent was added dropwise over 90 minutes.

| <Starting Monomer (1b-3)> | |
|---|---|
| Styrene | 335.0 parts by mass |
| n-Butyl acrylate | 211.0 parts by mass |
| Methacrylic acid | 44.0 parts by mass |
| n-octyl-3-mercaptopropionate | 8.1 parts by mass |

After the completion of the dropwise addition, the mixture was heated and stirred for 2 hours for polymerization, and then cooled to 28° C., thereby obtaining an amorphous resin fine particle dispersion liquid (1).

(D. 3) Preparation of Colorant Fine Particle Dispersion Liquid

While a solution obtained by adding 226 parts by mass of sodium dodecyl sulfate to 1600 parts by mass of ion-exchanged water was being stirred, 420 parts by mass of copper phthalocyanine (C. I. Pigment Blue 15:3) was gradually added thereto. Dispersion treatment was performed using a stirring apparatus CLEARMIX (manufactured by M Technique Co., Ltd., where “CLEARMIX” is a registered trademark of the company) to prepare a colorant fine particle dispersion liquid (P1). The volume-based median diameter of the colorant fine particles in the colorant fine particle dispersion liquid (P1) was measured and found to be 110 nm.

(D. 4) Production of Toner Particles

Into a reaction vessel equipped with a stirrer, a temperature sensor, and a cooling tube, 480 parts by mass (in terms of solid content) of the amorphous resin fine particle dispersion liquid (1) and 350 parts by mass of ion-exchanged water were charged. At room temperature (25° C.), a 5 mol/L aqueous sodium hydroxide solution was added to adjust the pH to 10. Furthermore, 36.4 parts by mass (in terms of solid) of the colorant fine particle dispersion liquid (P1) was charged, and 80 parts by mass of a 50 mass % aqueous solution of magnesium chloride was added under stirring at 30° C. over 10 minutes to obtain a dispersion liquid.

The obtained dispersion liquid was allowed to stand for 5 minutes, and then the dispersion liquid was heated to 82° C. over 60 minutes. After the liquid temperature of the dispersion liquid reached 82° C., 59.3 parts by mass (in terms of solid) of the crystalline resin fine particle dispersion liquid (1A) was added thereto over 20 minutes, and the stirring speed was adjusted such that the rate of growth of the particle diameter was 0.01 μm/min. The particles were grown until the volume-based median diameter measured by Coulter Multisizer 3 (manufactured by Beckman Coulter, Inc) reached 6.0 μm.

Next, an aqueous solution in which 80 parts by mass of sodium chloride was dissolved in 300 parts by mass of ion exchanged water was added to stop the growth of the particle diameter. Next, the mixture was stirred in a state of 82° C., fusion of the particles was allowed to proceed until the average circularity of the toner particles reached 0.970, and then the mixture was cooled at a temperature lowering rate of 0.5° C./min or more to lower the liquid temperature to 30° C. or less. Next, solid-liquid separation was performed, the dehydrated toner cake was re-dispersed in ion-exchanged water, and an operation of solid-liquid separation was repeated three times for washing. After the washing, the resultant was dried at 35° C. for 24 hours to produce a toner (1).

(D. 5) Mixing of External Additives

The following materials were mixed with a Henschel mixer (manufactured by Nippon Coke & Engineering Co., Ltd.) at a rotor peripheral speed of 35 mm/see at 32° C. for 20 minutes. After the mixing, coarse particles were removed with a sieve having an opening of 45 μm to obtain the toner (1). Note that the hydrophobic silica particles described below had a number average primary particle diameter of 12 nm and a hydrophobicity degree of 68. The hydrophobic titanium oxide particles described below had a number average primary particle diameter of 20 nm and a hydrophobicity degree of 63. The sol gel silica described below had a number average primary particle diameter of 110 nm.

| <Materials> | |
|---|---|
| Toner particles (1) | 100 parts by mass |
| Hydrophobic silica particles | 0.6 parts by mass |
| Hydrophobic titanium oxide particles | 1.0 parts by mass |
| Sol-gel silica | 1.0 parts by mass |

E. Mixing of Carrier

The toner (1) and a ferrite carrier coated with an acrylic resin and having a volume average particle diameter of 33 μm were added and mixed such that the concentration of the toner (1) was 6% by mass. Through the above steps, a two-component developer containing the toner (1) was produced.

F. Evaluation (RSm)

[Preparation]

Each of the produced developing sleeves was attached to a developing roller used in a developing unit of “bizhub C658” (manufactured by Konica Minolta, Inc) under a normal-temperature and normal-humidity environment of 23° C. and 50% RH. Furthermore, the two-component developer was loaded.

[Evaluation Method]

Thereafter, in a durability test, a halftone image and a solid image were continuously printed on one million sheets (1000 kp) of A3 size transfer material: “POD Gloss Coat (100 g/$m^2$)" (manufactured by Oji Paper Co., Ltd). Thereafter, the value of RSm after the durability test (after continuous printing) was measured by the following method, and compared with the value of RSm before the durability test, which are both shown in Table I.

The surface roughness of each of the produced developing sleeves was measured with a surface-roughness measuring device (model: SE700) manufactured by Kosaka Laboratory Ltd., under the following measurement conditions, and a roughness curve (roughness profile) was calculated.

| <Measurement Conditions> | |
|---|---|
| Measurement length | 8.000 mm |
| Measurement speed | 0.150 mm/s |
| Measurement range | ±64.000 μm |
| Calculation standard | JIS B 0601: 2013 |

Measurement type: roughness measurement shape removal least squares straight line evaluation lengths 8.000 mm λs No filter cutoff type: Gaussian cutoff wavelengths (λc) 0.08 mm Pickup type: standard pickup The measurement was performed under the conditions of a cut-off value of 0.8 mm, a measurement length of 8.000 mm, and a data interval of 1.6 μm.

The average length Rsm of roughness curve elements of the surface of each developing sleeve was obtained from the calculated roughness curve of the surface of the developing sleeve in accordance with JIS B 0601:2013.

(Developer Conveyance Amount)

[Preparation]

Each of the produced developing sleeves was attached to a developing roller used in a developing unit of "bizhub C658" (manufactured by Konica Minolta, Inc) under a normal-temperature and normal-humidity environment of 23° C. and 50% RH. Furthermore, the two-component developer was loaded.

[Evaluation Method]

Thereafter, in a durability test, a halftone image and a solid image were continuously printed on one million sheets (1000 kp) of A3 size transfer material: "POD Gloss Coat (100 g/$m^2$)" (manufactured by Oji Paper Co., Ltd). Thereafter, the developer conveyance amount after the durability test (after continuous printing) was calculated by the following method, and compared with the value thereof before the durability test, which are both shown in Table I.

The developer conveyance amount before the durability test was calculated as follows.

Figure 9A:
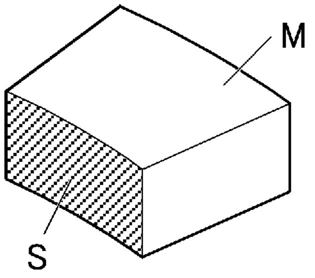
FIG. 9A is a schematic three dimensional view illustrating the shape of a mask jig.

The developing device was taken out from the main body of "bizhub C658" (manufactured by Konica Minolta, Inc) before the actual evaluation is actually started. The developing device contained the developer, and the developer was already held on the surface of each developing sleeve. The amount of the developer per unit area of the held developer was sucked by a suction mechanism such as a pump in a state where a mask jig having a shape as shown in FIG. 9A was pressed. From the masses before and after the suction, the developer conveyance amount per unit area [g/$m^2$] was calculated. Note that as the above-described suction mechanism, a pump shaped like a straw having a diameter of about 1 mm was used. Note that the area of a face S of the mask jig that contacted the surface of the developing sleeve (the area of the mask jig facing the surface of the developing sleeve) was 10 $cm^2$.

Figure 9B:
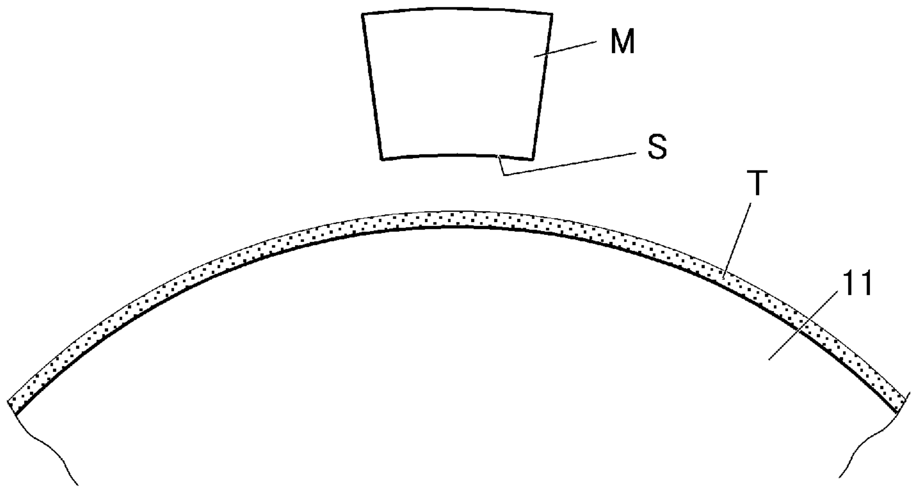
FIG. 9B is a schematic plan view illustrating a state before the mask jig is pressed against a developing sleeve.
Figure 9C:
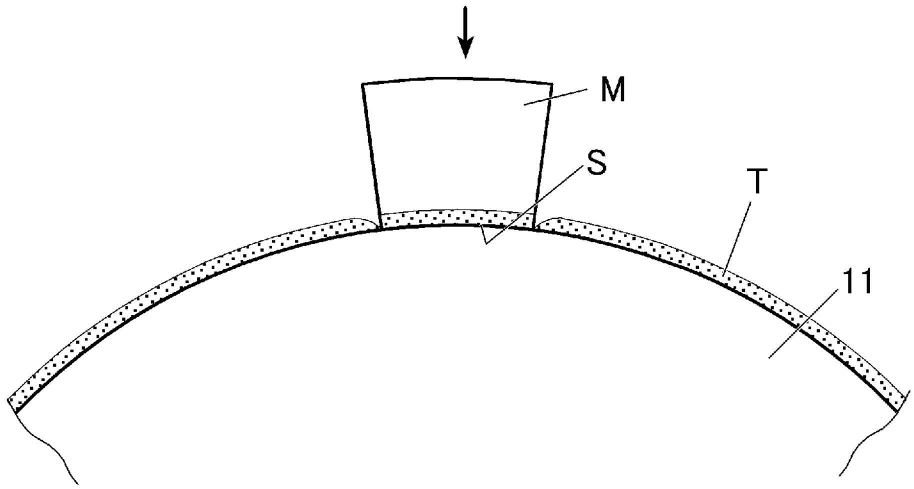
FIG. 9C is a schematic plan view showing a state where the mask jig is pressed against the developing sleeve.

FIG. 9A is a schematic three-dimensional view illustrating the shape of the mask jig. FIG. 9B is a schematic plan view illustrating a state before the mask jig is pressed against a developing sleeve. FIG. 9C is a schematic plan view illustrating a state where the mask jig is pressed against the developing sleeve. In FIG. 9A, FIG. 9B, and FIG. 9C, the face S indicate the area that is in contact with the surface of the developing sleeve 11 when the mask jig M is pressed against the surface of the developing sleeve 11, and this portion is hollow. Further, the face S has an arc shape in conformity with the surface of the developing sleeve 11. T represents a developer.

As to the developer conveyance amount after the durability test too, the developing device was taken out from the main body of "bizhub C658" (manufactured by Konica Minolta, Inc) after the durability test (after continuous printing), and the developer conveyance amount after the durability test was calculated by the same method as that used for the developer conveyance amount before the durability test.

(Density Unevenness)

[Preparation]

Each of the produced developing sleeves was attached to a developing roller used in a developing unit of "bizhub C658" (manufactured by Konica Minolta, Inc) under a normal-temperature and normal-humidity environment of 23° C. and 50% RH. Furthermore, the two-component developer was loaded.

[Evaluation Method]

A halftone image and a solid image were printed on the entire surface of A3 size transfer material: "POD Gloss Coat (100 g/$m^2$)" (manufactured by Oji Paper Co., Ltd) before a durability test, which was the initial stage of printing. Thereafter, in a durability test, the halftone image and the solid image were continuously printed on one million sheets (1000 kp) of A3 size transfer material: "POD Gloss Coat (100 g/$m^2$)" (manufactured by Oji Paper Co., Ltd). Immediately thereafter, the halftone image and the solid image were printed on the entire surface of separately prepared new A3 size transfer material: "POD Gloss Coat (100 g/$m^2$)" (manufactured by Oji Paper Co., Ltd) to produce a printed product for image unevenness evaluation after the durability test.

About the above printed product, the image quality state of the printed halftone image and solid image was evaluated by obtaining the change width of the color difference ΔE*ab between the initial stage of printing and after the durability test as follows.

The halftone image and the solid image were measured by a spectrophotometer and expressed in an L*a*b* color system, and ΔE*ab was obtained from the measured values. Note that the "L*a*b* color system" is a means usefully used to express colors in numerical values. The L* axis direction indicates brightness, the a* axis direction indicates hue in the red-green direction, and the b* axis direction indicates hue in the yellow-blue direction. When the L*a*b* values before the durability test were ($L_1$, $a_1$, $b_1$) and the L*a*b* values after the durability test were ($L_2$, $a_2$, $b_2$), ΔE*ab was obtained by substituting the values into the following formula.

$$\Delta E = \left[(L_1 - L_2)^2 + (a_1 - a_2)^2 + (b_1 - b_2)^2\right]^{0.5}$$

The L*, a*, and b* were measured with a spectrophotometer "Gretag Macbeth Spectrolino" (manufactured by Gretag Macbeth). The light source used was D65 light source, and the reflection measurement aperture used was ΦD4 mm. The measurement was performed with a measurement wavelength range of 380 to 730 nm at 10 nm intervals and a viewing angle of 2°. For the reference alignment, measurement was performed under conditions using a dedicated white tile.

The density unevenness was evaluated with evaluation criteria below. In the following evaluation criteria, A and B were regarded as having no problem in practical use and regarded as "pass". Further, C was regarded as "fail".

(Evaluation Criteria)

A: Color difference (ΔE) is 10 or less (Pass).

B: Color difference (ΔE) is more than 10 and 11 or less (Pass).

C: Color difference (ΔE) is more than 11 (Fail).

As the silicon content was larger, decrease in the value of Rsm after the durability test was further suppressed, and accordingly decrease in the developer conveyance amount was further suppressed, and therefore it is considered that the density unevenness was further suppressed. It can be seen that when the silicon content exceeded 0.8% by mass, decrease in the value of Rsm was even further suppressed, and accordingly decrease in the developer conveyance amount was even further suppressed.

In order to improve the developer conveying capability, it is preferable to form the grooves by sandblasting. However, it can be seen that the value of Rsm of the surface of the developing roller can be maintained in an appropriate range by increasing the silicon content as in Example 5 or 6 without forming grooves, and accordingly the developer conveyance amount can be maintained. Thus, it can be seen that the density unevenness can be prevented.

TABLE I

| EXAMPLE OR COMPARATIVE EXAMPLE | No. | DEVELOPING SLEEVE: ALLUMINUM ALLOY Si CONTENT [mass %] | Mg CONTENT [mass %] | Mn CONTENT [mass %] | GROOVE | SB | Rsm [μm] BEFORE *1 | Rsm [μm] AFTER *2 | CARRIER PARTICLE DIAMETER [μm] | CONVEYANCE AMOUNT [g/m2] BEFORE *3 | CONVEYANCE AMOUNT [g/m2] AFTER *4 | EVALUATION DENSITY UNEVENNESS HALFTONE IMAGE | SOLID IMAGE |
|---|---|---|---|---|---|---|---|---|---|---|---|---|---|
| EXAMPLE 1 | 1 | 0.65 | 0.03 | 0.01 | YES | YES | 81.0 | 45.0 | 33 | 252 | 160 | A | A |
| EXAMPLE 2 | 2 | 0.70 | 0.03 | 0.01 | YES | YES | 80.5 | 50.0 | 33 | 250 | 170 | A | A |
| EXAMPLE 3 | 3 | 0.80 | 0.03 | 0.01 | YES | YES | 79.0 | 60.0 | 33 | 247 | 200 | A | A |
| EXAMPLE 4 | 4 | 1.00 | 0.03 | 0.01 | YES | YES | 80.9 | 70.0 | 33 | 260 | 230 | A | A |
| EXAMPLE 5 | 5 | 3.20 | 0.03 | 0.01 | NO | YES | 79.5 | 75.0 | 33 | 251 | 195 | A | A |
| EXAMPLE 6 | 6 | 4.00 | 0.03 | 0.01 | NO | YES | 81.5 | 78.0 | 33 | 246 | 205 | A | A |
| EXAMPLE 7 | 7 | 0.65 | 0.03 | 0.00 | YES | YES | 78.8 | 45.0 | 33 | 240 | 165 | A | A |
| EXAMPLE 8 | 8 | 0.65 | 0.00 | 0.01 | YES | YES | 78.2 | 37.0 | 33 | 265 | 158 | A | A |
| EXAMPLE 9 | 9 | 0.65 | 0.00 | 0.00 | YES | YES | 80.6 | 29.0 | 33 | 268 | 152 | B | A |
| EXAMPLE 10 | 10 | 0.65 | 5.00 | 0.00 | YES | YES | 78.9 | 44.0 | 33 | 260 | 232 | A | A |
| EXAMPLE 11 | 11 | 0.65 | 0.00 | 2.00 | YES | YES | 81.8 | 48.0 | 33 | 255 | 236 | A | A |
| EXAMPLE 12 | 12 | 4.50 | 5.00 | 2.00 | YES | YES | 80.9 | 60.0 | 33 | 249 | 235 | A | B |
| EXAMPLE 13 | 13 | 0.65 | 5.05 | 0.00 | YES | YES | 81.7 | 65.0 | 33 | 257 | 232 | A | B |
| EXAMPLE 14 | 14 | 0.65 | 0.00 | 2.05 | YES | YES | 80.3 | 67.0 | 33 | 267 | 232 | A | B |
| COMPARATIVE EXAMPLE 1 | 15 | 0.10 | 5.00 | 2.00 | YES | YES | 80.9 | 22.0 | 33 | 245 | 100 | C | A |
| COMPARATIVE EXAMPLE 2 | 16 | 0.30 | 5.00 | 2.00 | YES | YES | 79.9 | 25.0 | 33 | 241 | 110 | C | A |
| COMPARATIVE EXAMPLE 3 | 17 | 0.60 | 0.03 | 0.01 | YES | YES | 78.6 | 26.0 | 33 | 257 | 115 | C | A |
| COMPARATIVE EXAMPLE 4 | 18 | 0.60 | 5.00 | 2.00 | YES | NO | 78.1 | 18.0 | 33 | 252 | 80 | C | A |
| COMPARATIVE EXAMPLE 5 | 19 | 0.60 | 5.00 | 2.00 | YES | YES | 81.3 | 28.0 | 33 | 262 | 135 | C | A |

*1: AVERAGE LENGTH (Rsm) OF ROUGHNESS CURVE ELEMENTS OF DEVELOPING SLEEVE BEFORE DURABILITY TEST
*2: AVERAGE LENGTH (Rsm) OF ROUGHNESS CURVE ELEMENTS OF DEVELOPING SLEEVE AFTER DURABILITY TEST
*3: INITIAL CONVEYANCE AMOUNT BY DEVELOPING SLEEVE BEFORE DURABILITY TEST
*4: CONVEYANCE AMOUNT BY DEVELOPING SLEEVE AFTER DURABILITY TEST
"SB" IN TABLE INDICATES SANDBLASTING

General Evaluation

As can be seen from Table I, in Comparative Examples in which the silicon content in the aluminum alloy contained in the developing sleeve was 0.6% by mass or less, the value of Rsm after the durability test largely decreased from the value of Rsm before the durability test. On the other hand, in Examples in which the silicon content exceeded 0.6% by mass, the value of Rsm after the durability test did not largely decrease from the value of Rsm before the durability test.

Thus, it can be seen that Examples had excellent durability of the developer conveying capability and maintained good image quality, as compared with Comparative Examples.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese Patent Application No. 2023-066090, filed on Apr. 14, 2023, including description, claims, drawings and abstract is incorporated herein by reference.

What is claimed is:

1. A developing sleeve for an electrophotographic image forming apparatus, comprising an aluminum alloy containing more than 0.6% by mass of silicon and conveying a developer containing a toner and a carrier.

2. The developing sleeve according to claim 1, wherein the aluminum alloy contains more than 0.8% by mass of the silicon.

3. The developing sleeve according to claim 1, wherein the developing sleeve has no resin layer on a surface thereof.

4. The developing sleeve according to claim 1, wherein the developing sleeve has a groove on a surface thereof.

5. The developing sleeve according to claim 1, wherein a surface of the developing sleeve is sandblasted.

6. The developing sleeve according to claim 1, wherein an average length RSm of roughness curve elements of a surface of the developing sleeve is greater than or equal to a particle diameter of the carrier.

7. The developing sleeve according to claim 1,
wherein the aluminum alloy contains magnesium, and
wherein a content of the magnesium is 5.0% by mass or less with respect to a total mass of the aluminum alloy.

8. The developing sleeve according to claim 1,
wherein the aluminum alloy contains manganese, and
wherein a content of the manganese is 2.0% by mass or less with respect to a total mass of the aluminum alloy.

9. The developing sleeve according to claim 1, wherein the content of the silicon is more than 0.6% by mass and 4.4% by mass or less with respect to a total mass of the aluminum alloy.

10. An electrophotographic image forming apparatus comprising a developing sleeve including an aluminum alloy containing more than 0.6% by mass of silicon and conveying a developer containing a toner and a carrier.

* * * * *